US012795670B2

(12) United States Patent
Lee et al.

(10) Patent No.: US 12,795,670 B2
(45) Date of Patent: Nov. 10, 2026

(54) METHOD AND APPARATUS FOR TRANSMITTING LOCATION INFORMATION IN NR V2X

(71) Applicant: LG Electronics Inc., Seoul (KR)

(72) Inventors: Seungmin Lee, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 533 days.

(21) Appl. No.: 17/608,623

(22) PCT Filed: May 4, 2020

(86) PCT No.: PCT/KR2020/005914

§ 371 (c)(1),
(2) Date: Nov. 3, 2021

(87) PCT Pub. No.: WO2020/226404

PCT Pub. Date: Nov. 12, 2020

(65) Prior Publication Data

US 2022/0217698 A1 Jul. 7, 2022

Related U.S. Application Data

(60) Provisional application No. 62/983,561, filed on Feb. 28, 2020.

(30) Foreign Application Priority Data

May 3, 2019 (KR) ........................ 10-2019-0052619

(51) Int. Cl.
*H04W 4/00* (2018.01)
*H04L 1/1812* (2023.01)
(Continued)

(52) U.S. Cl.
CPC ........... *H04W 72/20* (2023.01); *H04L 1/1812* (2013.01); *H04W 4/023* (2013.01); *H04W 4/029* (2018.02)

(58) Field of Classification Search
CPC ..... H04W 72/20; H04W 4/023; H04W 4/029; H04W 4/06; H04W 76/14; H04W 4/40;
(Continued)

(56) References Cited

U.S. PATENT DOCUMENTS

2018/0115958 A1 4/2018 Raghavan et al.
2020/0313804 A1* 10/2020 Ryu ...................... H04L 5/0055
(Continued)

FOREIGN PATENT DOCUMENTS

CN 106941718 7/2017
CN 107439036 12/2017
(Continued)

OTHER PUBLICATIONS

Samsung (Feature lead summary#3 for 7.2.4.1 Physical layer structure for sidelink, R1-1905877, Apr. 2019).*
(Continued)

*Primary Examiner* — Lakeram Jangbahadur
(74) *Attorney, Agent, or Firm* — Fish & Richardson P.C.

(57) ABSTRACT

Provided are a method for performing wireless communication by a first device and an apparatus supporting same. The method may comprise the steps of: receiving, from a second device, information related to a zone through a physical sidelink shared channel (PSSCH); obtaining information related to a distance on the basis of a center position of the zone and a position of the first device; and determining whether to transmit HARQ feedback for the PSSCH to the second device on the basis of the information related to the distance.

11 Claims, 26 Drawing Sheets

(51) Int. Cl.
*H04W 4/02* (2018.01)
*H04W 4/029* (2018.01)
*H04W 72/20* (2023.01)

(58) Field of Classification Search
CPC .... H04W 64/00; H04L 1/1812; H04L 5/0044; H04L 5/0055; H04L 5/0064; H04L 2001/0092; H04L 1/1854; H04L 1/1864; H04L 1/1825
See application file for complete search history.

(56) References Cited

U.S. PATENT DOCUMENTS

| | | | | |
|---|---|---|---|---|
| 2022/0007410 A1* | 1/2022 | Cirik | ................. | H04W 72/1273 |
| 2023/0006778 A1* | 1/2023 | Ryu | ...................... | H04L 5/0055 |

FOREIGN PATENT DOCUMENTS

| | | | | |
|---|---|---|---|---|
| EP | 3793250 A1 * | 3/2021 | ............ | H04W 72/53 |
| GB | 2413732 | 11/2005 | | |
| JP | 2017-069623 | 4/2017 | | |
| KR | 10-2017-0097946 | 8/2017 | | |

OTHER PUBLICATIONS

Qualcomm (Discussion on Groupcast for NR V2X, R2-1901727, Mar. 2019).*
VIVO (Physical layer procedure for NR sidelink, R1-1904077, Apr. 2019).*
Huawei (Reliability /robustness enhancement with multi-TRP/ panel, R1-1903983, Apr. 2019).*
ZTE (Enhancements on Multi-TRP and Multi-panel Transmission, R1-1904013, Apr. 2019).*
Huawei567 (Enhancements on Multi-TH.P/panel transmission, R1-1901567, Mar. 2019).*
OPPO, "Physical layer procedure for NR-V2X sidelink," R1-1904920, Presented at 3GPP TSG RAN WG1 #96bis, Xi'an, China, Apr. 8-12, 2019, 8 pages.
Qualcomm Incorporated, "Discussion on Groupcast for NR V2X," R2-1901727 (revision of R2-1817780), Presented at 3GPP TSG-RAN WG2 Meeting #105, Athens, Greece, 25 Feb.-Mar. 1, 2019, 7 pages.
Sequans Communications, "On HARQ procedure for NR sidelink," R1-1905388, Presented at 3GPP TSG RAN WG1 Meeting #96bis, Xi'an, China, Apr. 8-12, 2019, 4 pages.
Vivo, "Physical layer procedure for NR sidelink," R1-1904077, Presented at 3GPP TSG RAN WG1 Meeting #96bis, Xi'an, China, Apr. 8-12, 2019, 11 pages.
Extended European Search Report in European Application No. 20802766.4, dated May 6, 2022, 6 pages.
Samsung, "Feature lead summary#3 for 7.2.4.1 Physical layer structure for sidelink," 3GPP TSG RAN WG1 #96bis Meeting, Draft R1-190xxxx (R1-1905877), Xi'an, China, Apr. 12-8, 2019, 26 pages.
Office Action in Japanese Appln. No. 2021-559575, dated Oct. 18, 2022, 7 pages (with English translation).
Qualcomm Incorporated, "Physical layer procedures for sidelink," R1-1905012, Presented at 3GPP TSG RAN WG1 Meeting #96bis, Xian, China, Apr. 8-12, 2019, 14 pages.
Office Action in Chinese Appln. No. 202080041123.3, mailed on Mar. 31, 2023, 16 pages (with English translation).

* cited by examiner (a)

(b)

(a)

(b)

| legend | content |
|---|---|
| ★ | location of receiving UE |
| ▲ | actual location of transmitting UE |
| ● | location of transmitting UE used by receiving UE to calculate distance between transmitting UE and receiving UE |
| — — — — | distance between receiving UE and transmitting UE obtained by receiving UE |

| legend | content |
| --- | --- |
| ★ | location of receiving UE |
| ▲ | actual location of transmitting UE |
| ○ | candidate location of transmitting UE used by receiving UE to calculate distance between transmitting UE and receiving UE |
| — — — — | distance between receiving UE and transmitting UE obtained by receiving UE |

| legend | content |
|---|---|
| ★ | location of receiving UE |
| ▲ | actual location of transmitting UE |
| ○ | candidate location of transmitting UE used by receiving UE to calculate distance between transmitting UE and receiving UE |
| — — — — | distance between receiving UE and transmitting UE obtained by receiving UE |

Device (100,200)

METHOD AND APPARATUS FOR TRANSMITTING LOCATION INFORMATION IN NR V2X

CROSS-REFERENCE TO RELATED APPLICATIONS

This application is a National Stage application under 35 U.S.C. § 371 of International Application No. PCT/KR2020/005914, filed on May 4, 2020, which claims the benefit of Korean Patent Application No. 10-2019-0052619, filed on May 3, 2019, and U.S. Provisional Application No. 62/983,561, filed on Feb. 28, 2020. The disclosures of the prior applications are incorporated by reference in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

Meanwhile, a receiving UE may calculate a distance between the receiving UE and a transmitting UE based on location information of the transmitting UE. Thereafter, if the distance between the receiving UE and the transmitting UE is less than or equal to a minimum required communication range, the receiving UE may transmit SL HARQ feedback. For the above reasons, the receiving UE needs to efficiently obtain a location of the transmitting UE.

Technical Solutions

In one embodiment, a method for performing, by a first device, groupcast communication with one or more second devices in a group is provided. The method may comprise: receiving, from a second device through a physical sidelink shared channel (PSSCH), information related to a zone; obtaining information related to a distance, based on a central location of the zone and a location of the first device; and determining whether or not to transmit HARQ feedback for the PSSCH to the second device, based on the information related to the distance.

In one embodiment, a first device configured to perform groupcast communication with one or more second devices in a group is provided. The first device may comprise: one or more memories storing instructions; one or more transceivers; and one or more processors connected to the one or more memories and the one or more transceivers. For example, the one or more processors may execute the instructions to: receive, from a second device through a physical sidelink shared channel (PSSCH), information related to a zone; obtain information related to a distance, based on a central location of the zone and a location of the first device; and determine whether or not to transmit HARQ feedback for the PSSCH to the second device, based on the information related to the distance.

Effects of the Disclosure

The user equipment (UE) may efficiently perform SL communication.

DESCRIPTION OF EXEMPLARY EMBODIMENTS

Figure 1:
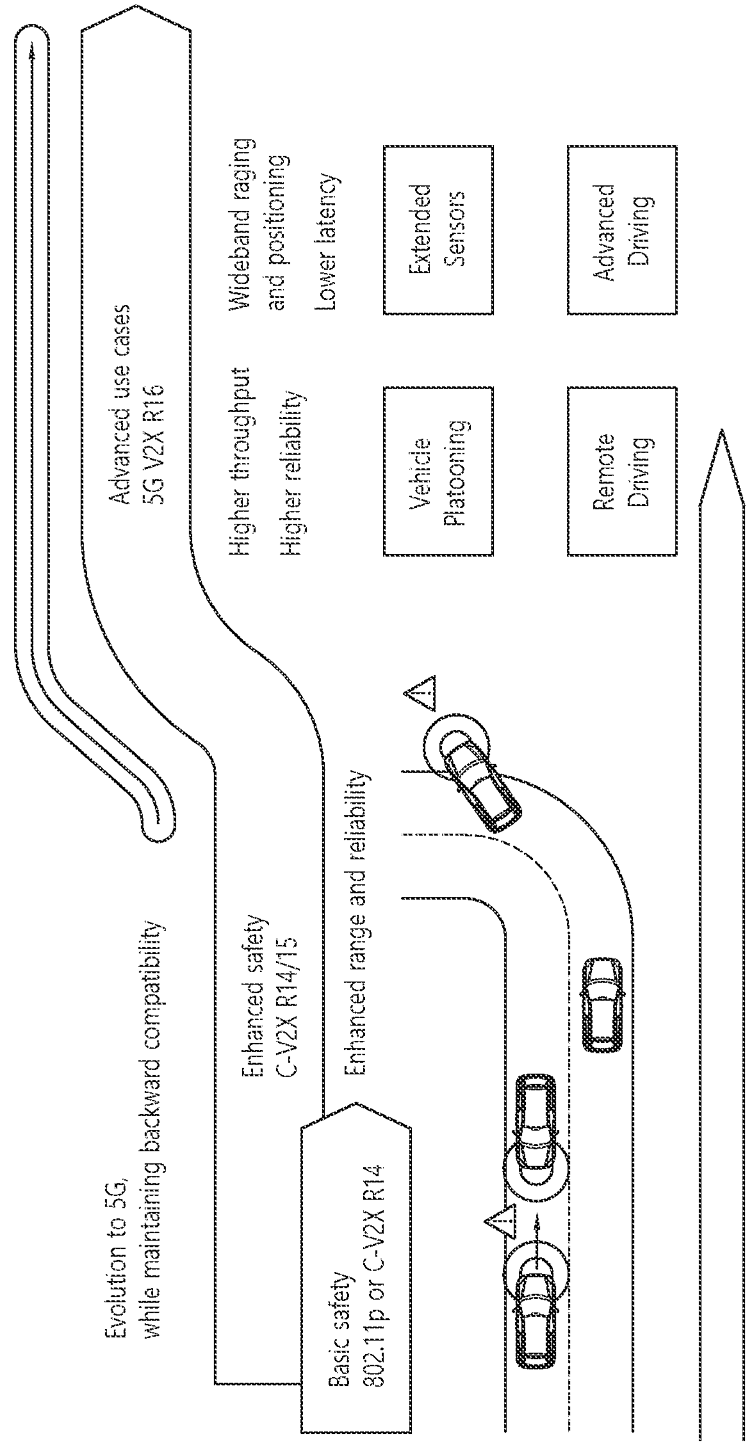
FIG. 1 is a drawing for describing V2X communication based on NR, compared to V2X communication based on RAT used before NR.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present disclosure may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
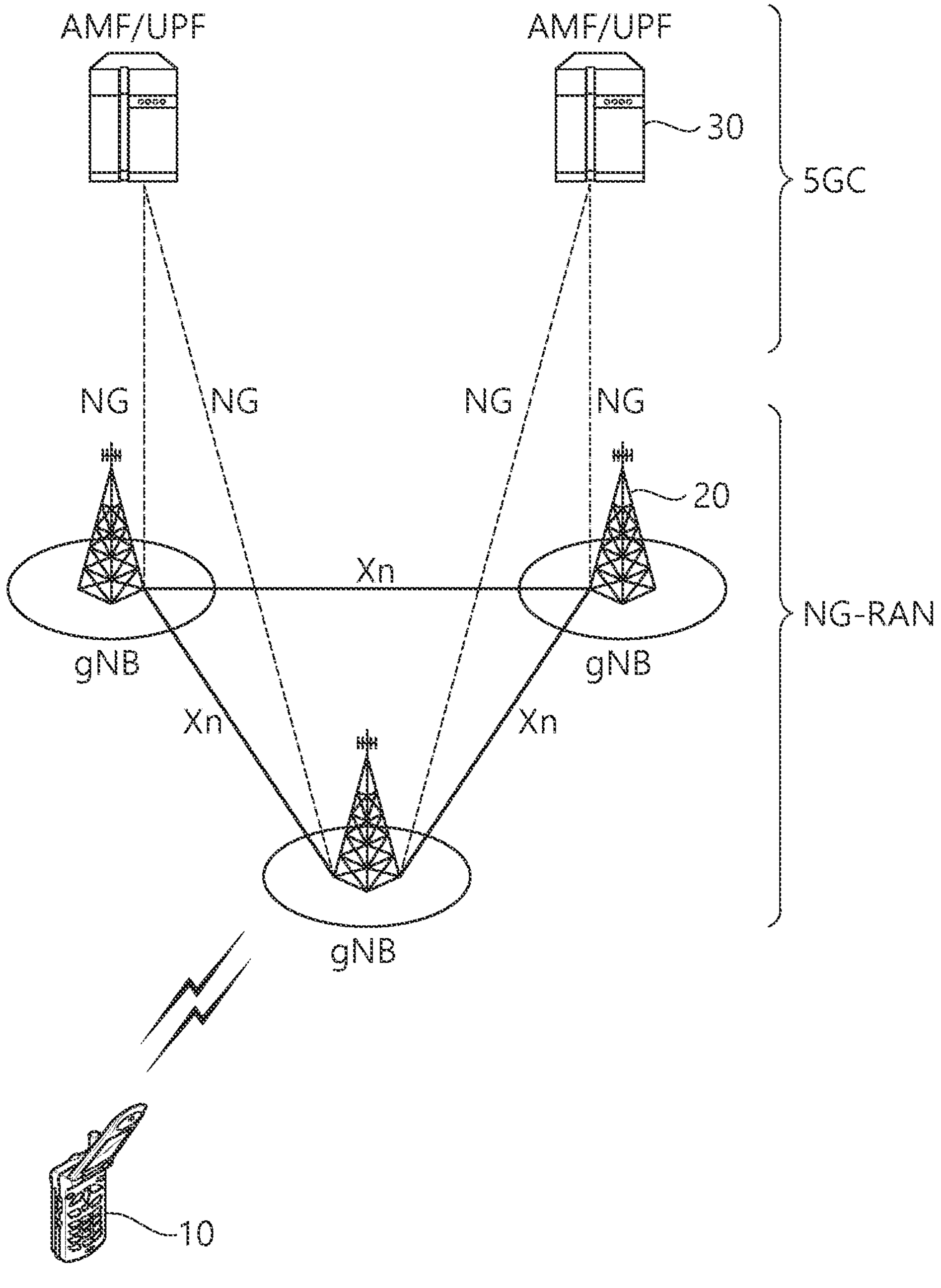
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
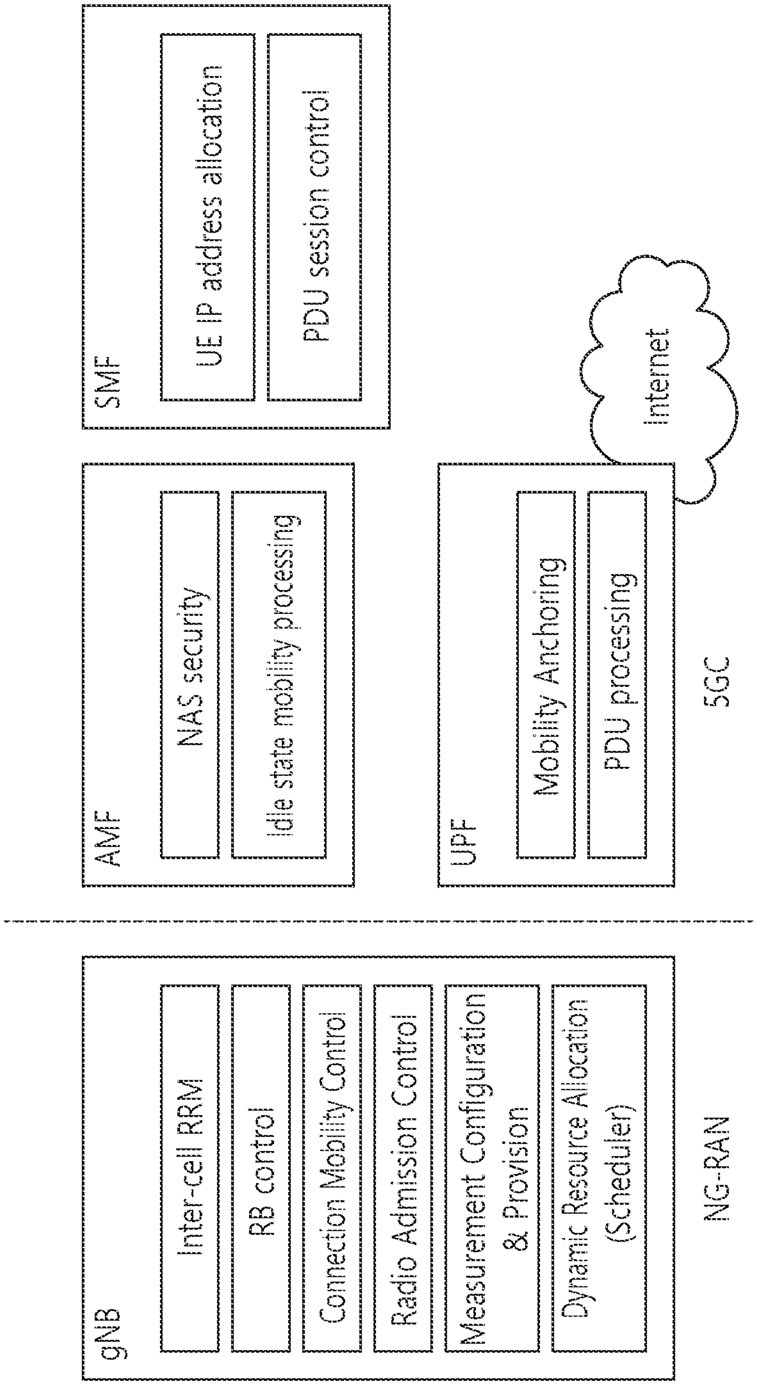
FIG. 3 shows a functional division between an NG-RAN and a 5GC, based on an embodiment of the present disclosure.

FIG. 3 shows a functional division between an NG-RAN and a 5GC, based on an embodiment of the present disclosure. The embodiment of FIG. 3 may be combined with various embodiments of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 4:
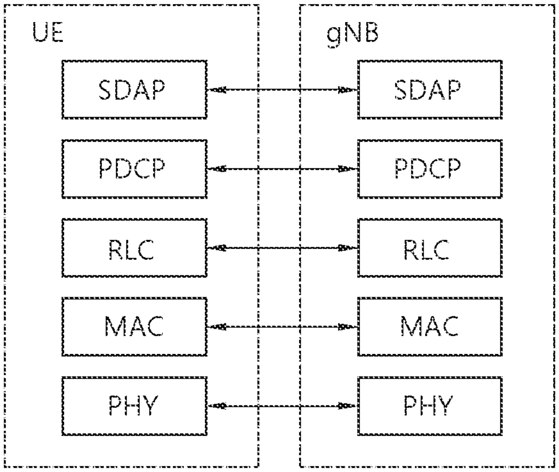
FIG. 4 shows a radio protocol architecture, based on an embodiment of the present disclosure.
Figure 4:
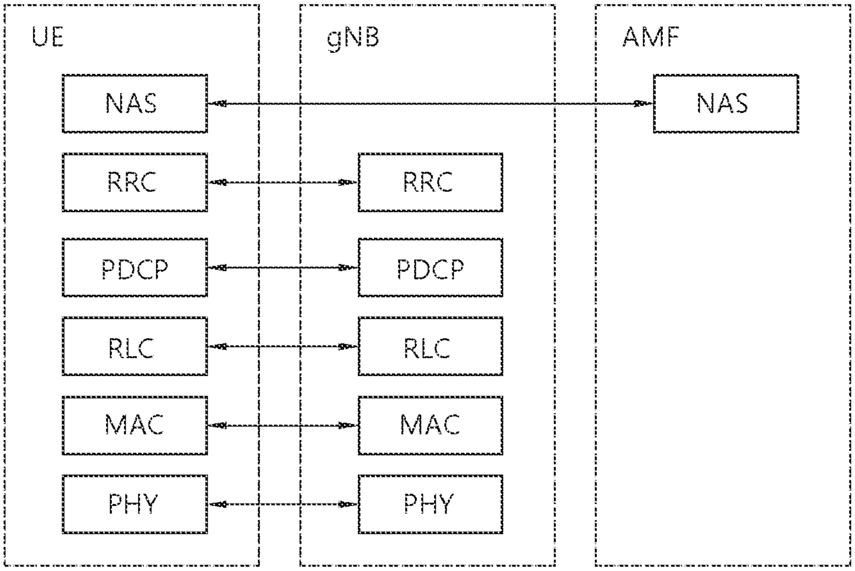

FIG. 4 shows a radio protocol architecture, based on an embodiment of the present disclosure. The embodiment of FIG. 4 may be combined with various embodiments of the present disclosure. Specifically, FIG. 4(*a*) shows a radio protocol architecture for a user plane, and FIG. 4(*b*) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each subframe may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
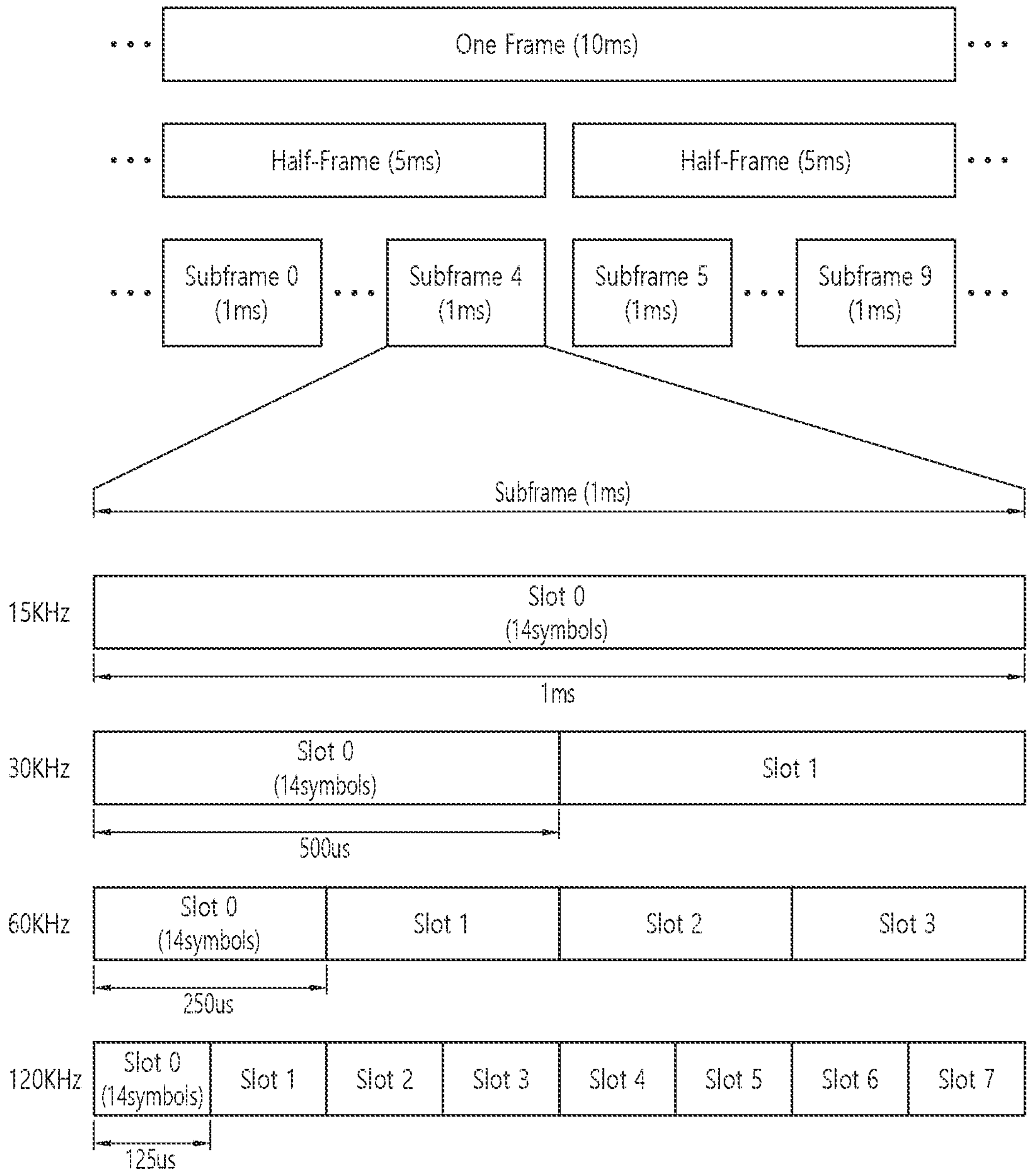
FIG. 5 shows a structure of an NR system, based on an embodiment of the present disclosure.

FIG. 5 shows a structure of an NR system, based on an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
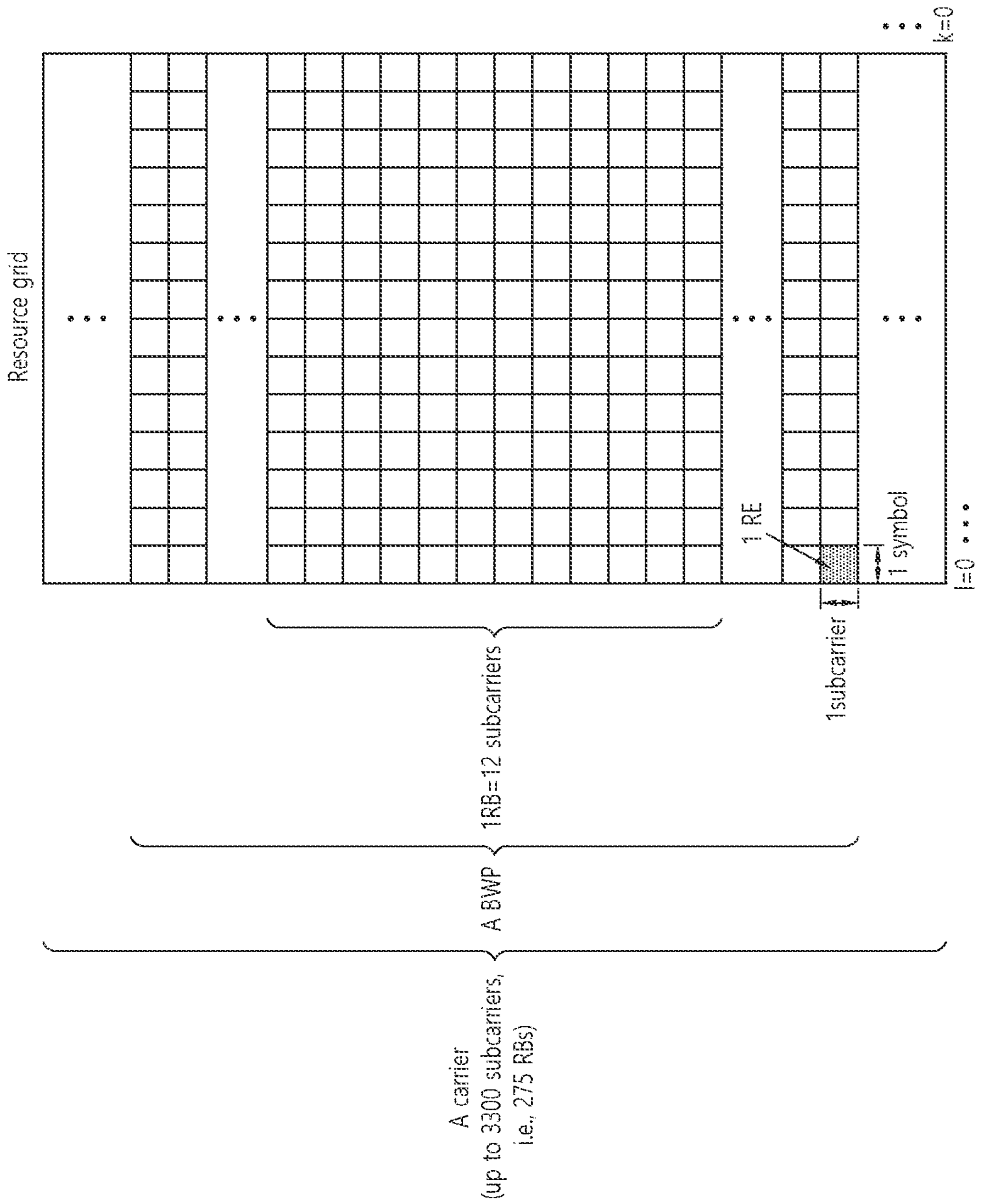
FIG. 6 shows a structure of a slot of an NR frame, based on an embodiment of the present disclosure.

FIG. 6 shows a structure of a slot of an NR frame, based on an embodiment of the present disclosure. The embodiment of FIG. 6 may be combined with various embodiments of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
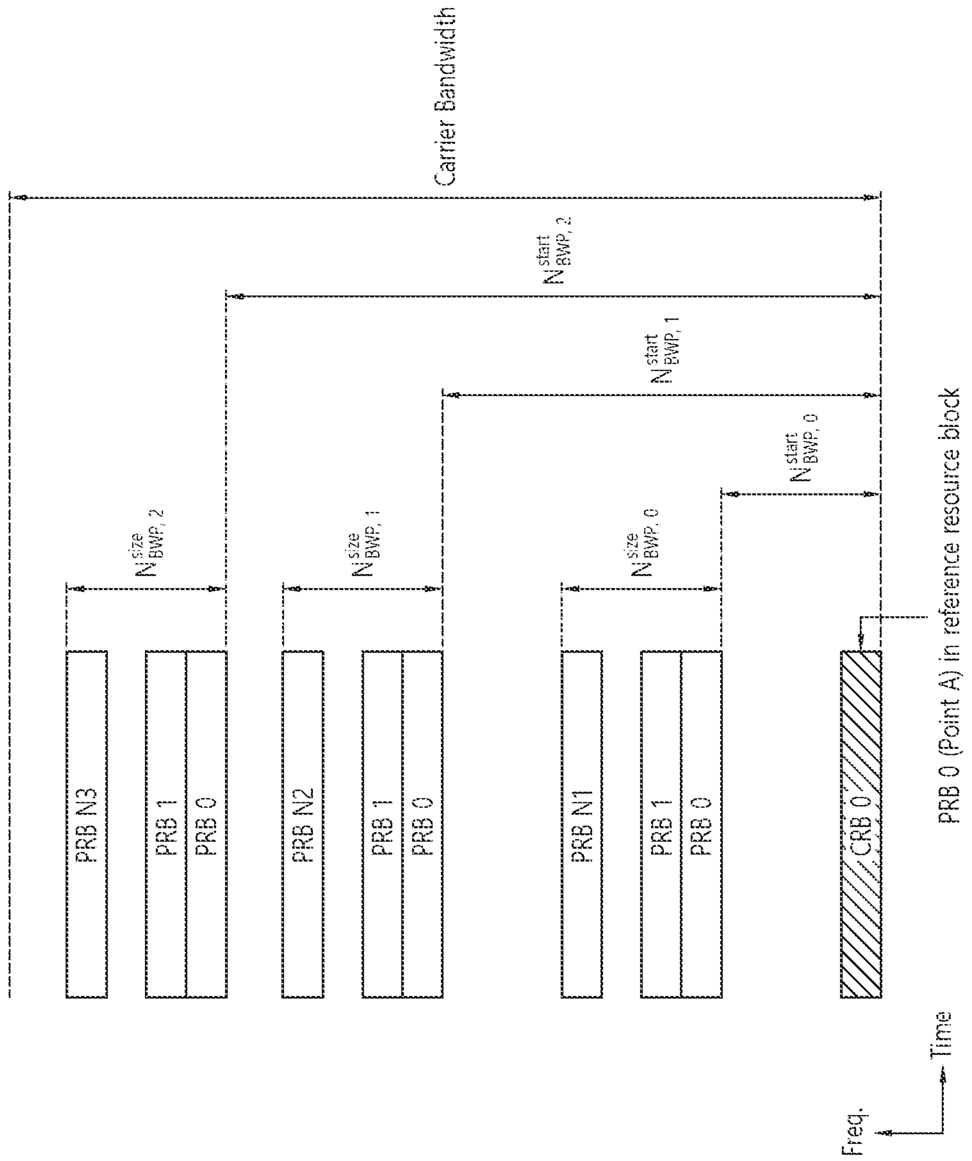
FIG. 7 shows an example of a BWP, based on an embodiment of the present disclosure.

FIG. 7 shows an example of a BWP, based on an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

Figure 8:
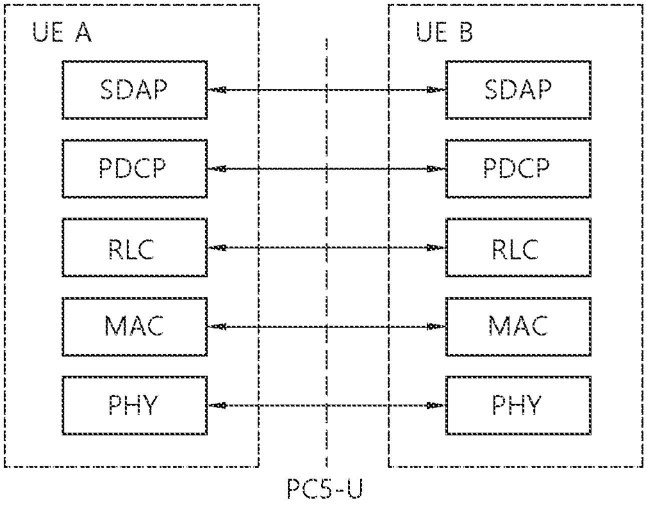
FIG. 8 shows a radio protocol architecture for a SL communication, based on an embodiment of the present disclosure.
Figure 8:
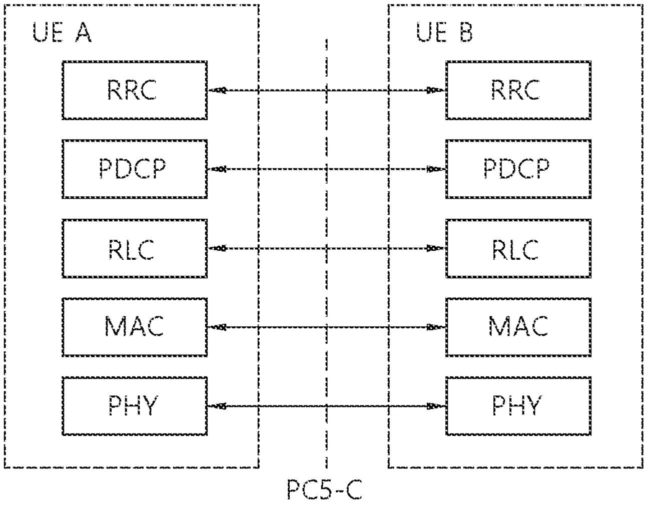

FIG. 8 shows a radio protocol architecture for a SL communication, based on an embodiment of the present disclosure. The embodiment of FIG. 8 may be combined with various embodiments of the present disclosure. More specifically, FIG. 8(*a*) shows a user plane protocol stack, and FIG. 8(*b*) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
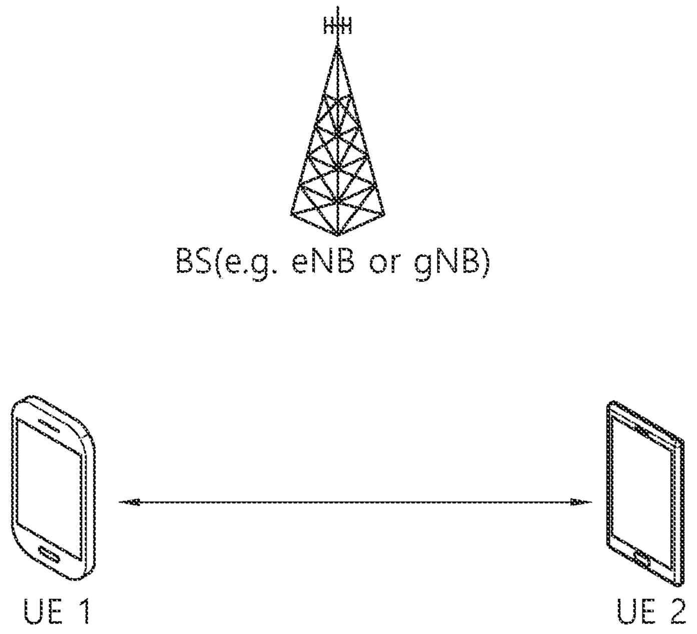
FIG. 9 shows a UE performing V2X or SL communication, based on an embodiment of the present disclosure.

FIG. 9 shows a UE performing V2X or SL communication, based on an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
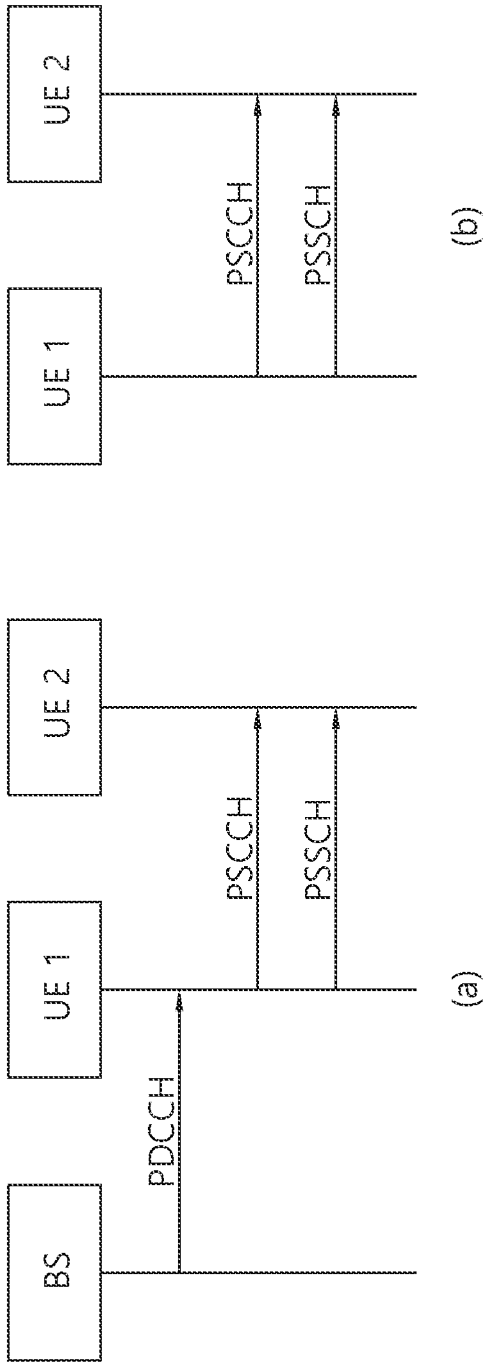
FIG. 10 shows a procedure of performing V2X or SL communication by a UE based on a transmission mode, based on an embodiment of the present disclosure.

FIG. 10 shows a procedure of performing V2X or SL communication by a UE based on a transmission mode, based on an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(*a*) shows a UE operation related to an LTE transmission mode 1 or an LTE transmission mode 3. Alternatively, for example, FIG. 10(*a*) shows a UE operation related to an NR resource allocation mode 1. For example, the LTE transmission mode 1 may be applied to general SL communication, and the LTE transmission mode 3 may be applied to V2X communication.

For example, FIG. 10(*b*) shows a UE operation related to an LTE transmission mode 2 or an LTE transmission mode 4. Alternatively, for example, FIG. 10(*b*) shows a UE operation related to an NR resource allocation mode 2.

Referring to FIG. 10(*a*), in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(*b*), in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
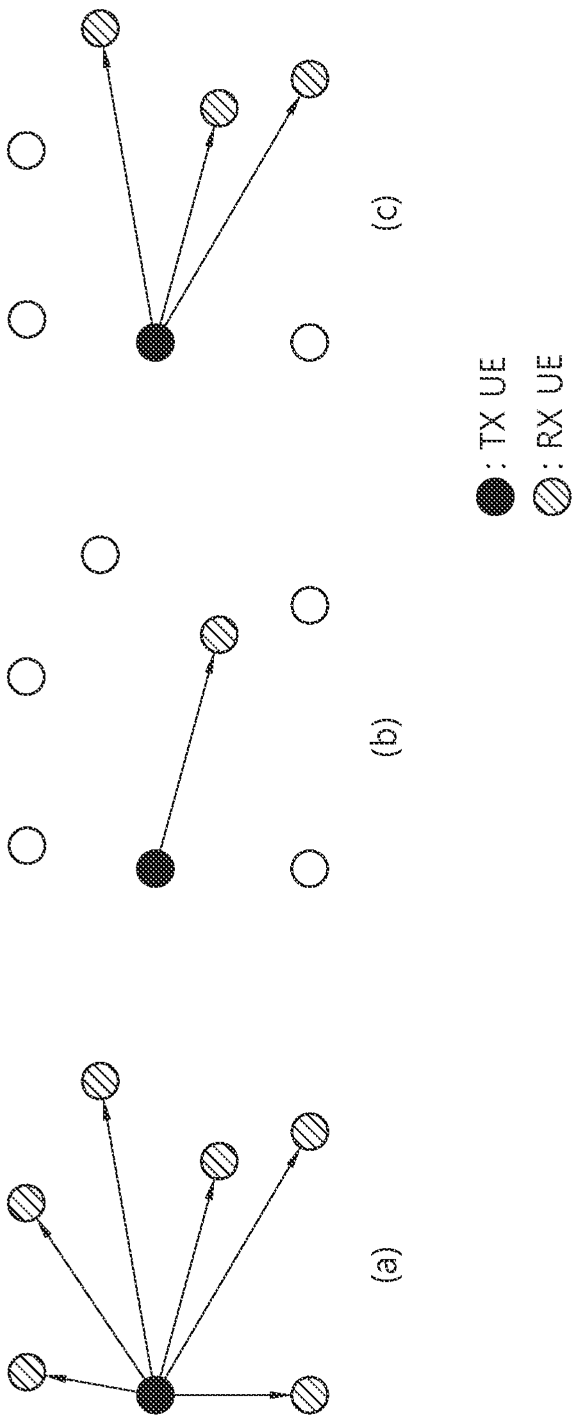
FIG. 11 shows three cast types, based on an embodiment of the present disclosure.

FIG. 11 shows three cast types, based on an embodiment of the present disclosure. The embodiment of FIG. 11 may be combined with various embodiments of the present disclosure. Specifically, FIG. 11(*a*) shows broadcast-type SL communication, FIG. 11(*b*) shows unicast type-SL communication, and FIG. 11(*c*) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, a sidelink control information (SCI) will be described.

Control information transmitted by a BS to a UE through a PDCCH may be referred to as downlink control information (DCI), whereas control information transmitted by the UE to another UE through a PSCCH may be referred to as SCI. For example, the UE may know in advance a start symbol of the PSCCH and/or the number of symbols of the PSCCH, before decoding the PSCCH. For example, the SCI may include SL scheduling information. For example, the UE may transmit at least one SCI to another UE to schedule the PSSCH. For example, one or more SCI formats may be defined.

For example, a transmitting UE may transmit the SCI to a receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, if SCI configuration fields are divided into two groups in consideration of a (relatively) high SCI payload size, an SCI including a first SCI configuration field group may be referred to as a first SCI or a $1^{st}$ SCI, and an SCI including a second SCI configuration field group may be referred to as a second SCI or a $2^{nd}$ SCI. For example, the transmitting UE may transmit the first SCI to the receiving UE through the PSCCH. For example, the transmitting UE may transmit the second SCI to the receiving UE on the PSCCH and/or the PSSCH. For example, the second SCI may be transmitted to the receiving UE through an (independent) PSCCH, or may be transmitted in a piggyback manner together with data through the PSSCH. For example, two consecutive SCIs may also be applied to different transmissions (e.g., unicast, broadcast, or groupcast).

For example, the transmitting UE may transmit the entirety or part of information described below to the receiving UE through the SCI. Herein, for example, the transmitting UE may transmit the entirety or part of the information described below to the receiving UE through the first SCI and/or the second SCI.

PSSCH and/or PSCCH related resource allocation information, e.g., the number/positions of time/frequency resources, resource reservation information (e.g., period), and/or SL CSI report request indicator or SL (L1) RSRP (and/or SL (L1) RSRQ and/or SL (L1) RSSI) report request indicator, and/or SL CSI transmission indicator (or SL (L1) RSRP (and/or SL (L1) RSRQ and/or SL (L1) RSSI) information transmission indicator)) (on PSSCH), and/or Modulation Coding Scheme (MCS) information, and/or Transmit power information, and/or L1 destination ID information and/or L1 source ID information, and/or SL HARQ process ID information, and/or New data indicator (NDI) information, and/or Redundancy version (RV) information, and/or (Transmission traffic/packet related) QoS information, e.g., priority information, and/or SL CSI-RS transmission indicator or information on the number of (to-be-transmitted) SL CSI-RS antenna ports Location information of a transmitting UE or location (or distance region) information of a target receiving UE (for which SL HARQ feedback is requested), and/or Reference signal (e.g., DMRS, etc.) related to channel estimation and/or decoding of data to be transmitted through a PSSCH, e.g., information related to a pattern of a (time-frequency) mapping resource of DMRS, rank information, antenna port index information For example, the first SCI may include information related to channel sensing. For example, the receiving UE may decode the second SCI by using a PSSCH DMRS. A polar code used in a PDCCH may be applied to the second SCI. For example, in a resource pool, a payload size of the first SCI may be identical for unicast, groupcast, and broadcast. After decoding the first SCI, the receiving UE does not have to perform blind decoding of the second SCI. For example, the first SCI may include scheduling information of the second SCI.

Meanwhile, in various embodiments of the present disclosure, since the transmitting UE may transmit at least one of the SCI, the first SCI, and/or the second SCI to the receiving UE through the PSCCH, the PSCCH may be replaced/substituted with at least one of the SCI, the first SCI, and/or the second SCI. Additionally/alternatively, for example, the SCI may be replaced/substituted with at least one of the PSCCH, the first SCI, and/or the second SCI. Additionally/alternatively, for example, since the transmitting UE may transmit the second SCI to the receiving UE through the PSSCH, the PSSCH may be replaced/substituted with the second SCI.

Hereinafter, a hybrid automatic repeat request (HARQ) procedure will be described.

An error compensation scheme is used to secure communication reliability. Examples of the error compensation scheme may include a forward error correction (FEC) scheme and an automatic repeat request (ARQ) scheme. In the FEC scheme, errors in a receiving end are corrected by attaching an extra error correction code to information bits. The FEC scheme has an advantage in that time delay is small and no information is additionally exchanged between a transmitting end and the receiving end but also has a disadvantage in that system efficiency deteriorates in a good channel environment. The ARQ scheme has an advantage in that transmission reliability can be increased but also has a disadvantage in that a time delay occurs and system efficiency deteriorates in a poor channel environment.

A hybrid automatic repeat request (HARQ) scheme is a combination of the FEC scheme and the ARQ scheme. In the HARQ scheme, it is determined whether an unrecoverable error is included in data received by a physical layer, and retransmission is requested upon detecting the error, thereby improving performance.

In case of SL unicast and groupcast, HARQ feedback and HARQ combining in the physical layer may be supported. For example, when a receiving UE operates in a resource allocation mode 1 or 2, the receiving UE may receive the PSSCH from a transmitting UE, and the receiving UE may transmit HARQ feedback for the PSSCH to the transmitting UE by using a sidelink feedback control information (SFCI) format through a physical sidelink feedback channel (PSFCH).

For example, the SL HARQ feedback may be enabled for unicast. In this case, in a non-code block group (non-CBG) operation, if the receiving UE decodes a PSCCH of which a target is the receiving UE and if the receiving UE successfully decodes a transport block related to the PSCCH, the receiving UE may generate HARQ-ACK. In addition, the receiving UE may transmit the HARQ-ACK to the transmitting UE. Otherwise, if the receiving UE cannot successfully decode the transport block after decoding the PSCCH of which the target is the receiving UE, the receiving UE may generate the HARQ-NACK. In addition, the receiving UE may transmit HARQ-NACK to the transmitting UE.

For example, the SL HARQ feedback may be enabled for groupcast. For example, in the non-CBG operation, two HARQ feedback options may be supported for groupcast.

(1) Groupcast option 1: After the receiving UE decodes the PSCCH of which the target is the receiving UE, if the receiving UE fails in decoding of a transport block related to the PSCCH, the receiving UE may transmit HARQ-NACK to the transmitting UE through a PSFCH. Otherwise, if the receiving UE decodes the PSCCH of which the target is the receiving UE and if the receiving UE successfully decodes the transport block related to the PSCCH, the receiving UE may not transmit the HARQ-ACK to the transmitting UE.

(2) Groupcast option 2: After the receiving UE decodes the PSCCH of which the target is the receiving UE, if the receiving UE fails in decoding of the transport block related to the PSCCH, the receiving UE may transmit HARQ-NACK to the transmitting UE through the PSFCH. In addition, if the receiving UE decodes the PSCCH of which the target is the receiving UE and if the receiving UE successfully decodes the transport block related to the PSCCH, the receiving UE may transmit the HARQ-ACK to the transmitting UE through the PSFCH.

For example, if the groupcast option 1 is used in the SL HARQ feedback, all UEs performing groupcast communication may share a PSFCH resource. For example, UEs belonging to the same group may transmit HARQ feedback by using the same PSFCH resource.

For example, if the groupcast option 2 is used in the SL HARQ feedback, each UE performing groupcast communication may use a different PSFCH resource for HARQ feedback transmission. For example, UEs belonging to the same group may transmit HARQ feedback by using different PSFCH resources.

For example, when the SL HARQ feedback is enabled for groupcast, the receiving UE may determine whether to transmit the HARQ feedback to the transmitting UE based on a transmission-reception (TX-RX) distance and/or RSRP.

For example, in the groupcast option 1, in case of the TX-RX distance-based HARQ feedback, if the TX-RX distance is less than or equal to a communication range requirement, the receiving UE may transmit HARQ feedback for the PSSCH to the transmitting UE. Otherwise, if the TX-RX distance is greater than the communication range requirement, the receiving UE may not transmit the HARQ feedback for the PSSCH to the transmitting UE. For example, the transmitting UE may inform the receiving UE of a location of the transmitting UE through SCI related to the PSSCH. For example, the SCI related to the PSSCH may be second SCI. For example, the receiving UE may estimate or obtain the TX-RX distance based on a location of the receiving UE and the location of the transmitting UE. For example, the receiving UE may decode the SCI related to the PSSCH and thus may know the communication range requirement used in the PSSCH.

For example, in case of the resource allocation mode 1, a time (offset) between the PSFCH and the PSSCH may be configured or pre-configured. In case of unicast and groupcast, if retransmission is necessary on SL, this may be indicated to a BS by an in-coverage UE which uses the PUCCH. The transmitting UE may transmit an indication to a serving BS of the transmitting UE in a form of scheduling request (SR)/buffer status report (BSR), not a form of HARQ ACK/NACK. In addition, even if the BS does not receive the indication, the BS may schedule an SL retransmission resource to the UE. For example, in case of the resource allocation mode 2, a time (offset) between the PSFCH and the PSSCH may be configured or pre-configured.

For example, from a perspective of UE transmission in a carrier, TDM between the PSCCH/PSSCH and the PSFCH may be allowed for a PSFCH format for SL in a slot. For example, a sequence-based PSFCH format having a single symbol may be supported. Herein, the single symbol may not an AGC duration. For example, the sequence-based PSFCH format may be applied to unicast and groupcast.

For example, in a slot related to a resource pool, a PSFCH resource may be configured periodically as N slot durations, or may be pre-configured. For example, N may be configured as one or more values greater than or equal to 1. For example, N may be 1, 2, or 4. For example, HARQ feedback for transmission in a specific resource pool may be transmitted only through a PSFCH on the specific resource pool.

For example, if the transmitting UE transmits the PSSCH to the receiving UE across a slot #X to a slot #N, the receiving UE may transmit HARQ feedback for the PSSCH to the transmitting UE in a slot #(N+A). For example, the slot #(N+A) may include a PSFCH resource. Herein, for example, A may be a smallest integer greater than or equal to K. For example, K may be the number of logical slots. In this case, K may be the number of slots in a resource pool. Alternatively, for example, K may be the number of physical slots. In this case, K may be the number of slots inside or outside the resource pool.

For example, if the receiving UE transmits HARQ feedback on a PSFCH resource in response to one PSSCH transmitted by the transmitting UE to the receiving UE, the receiving UE may determine a frequency domain and/or code domain of the PSFCH resource based on an implicit mechanism in a configured resource pool. For example, the receiving UE may determine the frequency domain and/or code domain of the PSFCH resource, based on at least one of a slot index related to PSCCH/PSSCH/PSFCH, a sub-channel related to PSCCH/PSSCH, and/or an identifier for identifying each receiving UE in a group for HARQ feedback based on the groupcast option 2. Additionally/alternatively, for example, the receiving UE may determine the frequency domain and/or code domain of the PSFCH resource, based on at least one of SL RSRP, SINR, L1 source ID, and/or location information.

For example, if HARQ feedback transmission through the PSFCH of the UE and HARQ feedback reception through the PSFCH overlap, the UE may select any one of HARQ feedback transmission through the PSFCH and HARQ feedback reception through the PSFCH based on a priority rule. For example, the priority rule may be based on at least priority indication of the related PSCCH/PSSCH.

For example, if HARQ feedback transmission of a UE through a PSFCH for a plurality of UEs overlaps, the UE may select specific HARQ feedback transmission based on the priority rule. For example, the priority rule may be based on at least priority indication of the related PSCCH/PSSCH.

In the present disclosure, a transmitting UE may be a UE which transmits data or control information. For example, the transmitting UE may be a UE which transmits data or control information to a (target) receiving UE. For example, the transmitting UE may be a UE which transmits a PSCCH and/or a PSSCH. The transmitting UE may be a UE which transmits a sidelink CSI report request indicator and/or CSI-RS(s) for sidelink. For example, the transmitting UE may be a UE which transmits the CSI-RS(s) and/or the CSI report request indicator to a (target) receiving UE. The transmitting UE may be a UE which transmits a sidelink (L1) RSRP report request indicator and/or (pre-defined) reference signal(s) to be used for sidelink (L1) RSRP measurement. For example, the transmitting UE may be a UE which transmits the sidelink (L1) RSRP report request indicator and/or the (pre-defined) reference signal(s) to be used for sidelink (L1) RSRP measurement to a (target) receiving UE. For example, the (pre-defined) reference signal(s) to be used for sidelink (L1) RSRP measurement may be PSSCH DM-RS(s). The transmitting UE may be a UE which transmits a channel to be used for sidelink radio link monitoring (RLM) operation and/or sidelink radio link failure (RLF) operation (of a (target) receiving UE). For example, the channel to be used for sidelink RLM operation and/or sidelink RLF operation may be a PSCCH or a PSSCH. The transmitting UE may be a UE which transmits reference signal(s) (e.g., DM-RS(s) or CSI-RS(s)) on the channel to be used for sidelink RLM operation and/or sidelink RLF operation.

In the present disclosure, a receiving UE may be a UE which transmits sidelink HARQ feedback (to a transmitting UE) based on whether or not decoding of data received from the transmitting UE is successful. The receiving UE may be a UE which transmits sidelink HARQ feedback (to the transmitting UE) based on whether or not detection/decoding of a PSCCH (related to PSSCH scheduling) transmitted by the transmitting UE is successful. The receiving UE may be a UE which transmits sidelink CSI (to the transmitting UE) based on CSI-RS(s) and/or a CSI report request indicator received from the transmitting UE. The receiving UE may be a UE which transmits a sidelink (L1) RSRP measurement value (to the transmitting UE) based on (pre-defined) reference signal(s) and/or a sidelink (L1) RSRP report request indicator received from the transmitting UE. The receiving UE may be a UE which transmits its own data or control information (to the transmitting UE). The receiving UE may be a UE which performs RLM operation and/or RLF operation based on a (pre-configured) channel (e.g., a PSCCH or a PSSCH) received from the transmitting UE. The receiving UE may be a UE which performs RLM operation and/or RLF operation based on reference signal(s) on the (pre-configured) channel received from the transmitting UE.

In the present disclosure, the term PSCCH may be interpreted as or extended to a SCI. For example, a transmitting UE transmitting a PSCCH to a receiving UE may include the transmitting UE transmitting a SCI to the receiving UE through the PSCCH. In the present disclosure, the term PSCCH may be interpreted as or extended to a $1^{st}$ SCI (or a $2^{nd}$ SCI). For example, a transmitting UE transmitting a PSCCH to a receiving UE may include the transmitting UE transmitting a $1^{st}$ SCI (or a $2^{nd}$ SCI) to the receiving UE through the PSCCH. In the present disclosure, the term SCI may be interpreted as or extended to a PSCCH (and/or a $1^{st}$ SCI (or a $2^{nd}$ SCI)). For example, a transmitting UE transmitting a SCI to a receiving UE may include the transmitting UE transmitting a PSCCH (and/or a $1^{st}$ SCI (or a $2^{nd}$ SCI)) to the receiving UE. In the present disclosure, the term PSSCH may be interpreted as or extended to a $2^{nd}$ SCI. For example, a transmitting UE transmitting a PSSCH to a receiving UE may include the transmitting UE transmitting a $2^{nd}$ SCI to the receiving UE.

Herein, for example, the $1^{st}$ SCI and the $2^{nd}$ SCI may refer to a SCI of one group and a SCI of another group, respectively, when dividing SCI configuration fields into two groups in consideration of the size of (relatively) high SCI payload. Also, the $1^{st}$ SCI and the $2^{nd}$ SCI may be transmitted through different channels. For example, a transmitting UE may transmit the $1^{st}$ SCI through a PSCCH, and may transmit the $2^{nd}$ SCI together with data by piggybacking it on a PSSCH. Alternatively, for example, a transmitting UE may transmit the $1^{st}$t SCI through a PSCCH, and may transmit the $2^{nd}$ SCI through a (independent) PSCCH.

In the present disclosure, the term "configure or define" may be interpreted as being (pre-)configured (through pre-defined signaling (e.g., SIB, MAC signaling, RRC signaling)) from a base station or a network. For example, "A may be configured" may include that "a base station or a network may (pre-)configure/define or inform A to a UE". Alternatively, the term "configure or define" may be interpreted as being configured or defined in advance by the system. For example, "A may be configured" may include that "A may be configured/defined in advance by the system". Also, in the present disclosure, an RLF may be determined based on at least one of OUT-OF-SYNCH and IN-SYNCH. In the present disclosure, a resource block (RB) may be interpreted as or extended to a subcarrier.

In the present disclosure, a receiving UE may transmit (to a transmitting UE) at least one of sidelink HARQ feedback, sidelink CSI, or sidelink (L1) RSRP. In the present disclosure, a (physical) channel used by the receiving UE for transmitting at least one of sidelink HARQ feedback, sidelink CSI, or sidelink (L1) RSRP (to the transmitting UE) may be referred to as a physical sidelink feedback channel (PSFCH) or a sidelink feedback channel.

Meanwhile, for example, in the case of groupcast, a receiving UE may calculate a distance between the receiving UE and a transmitting UE based on location information of the transmitting UE. For example, the groupcast may be connectionless groupcast. To this end, the transmitting UE may transmit location information of the transmitting UE to the receiving UE through a pre-configured channel. For example, the pre-configured channel may be a PSCCH. For example, the pre-configured channel may be a PSSCH. Thereafter, if the distance between the receiving UE and the transmitting UE is less than or equal to a minimum required communication range (hereinafter, MIN_RANGE), the receiving UE may transmit SL HARQ feedback. For example, the SL HARQ feedback may be HARQ feedback for the PSSCH and/or the PSCCH transmitted by the transmitting UE. For example, MIN_RANGE may be a service/packet related requirement. For example, MIN_RANGE may be a communication range requirement related to service(s)/packet(s) transmitted by the transmitting UE.

Figure 12:
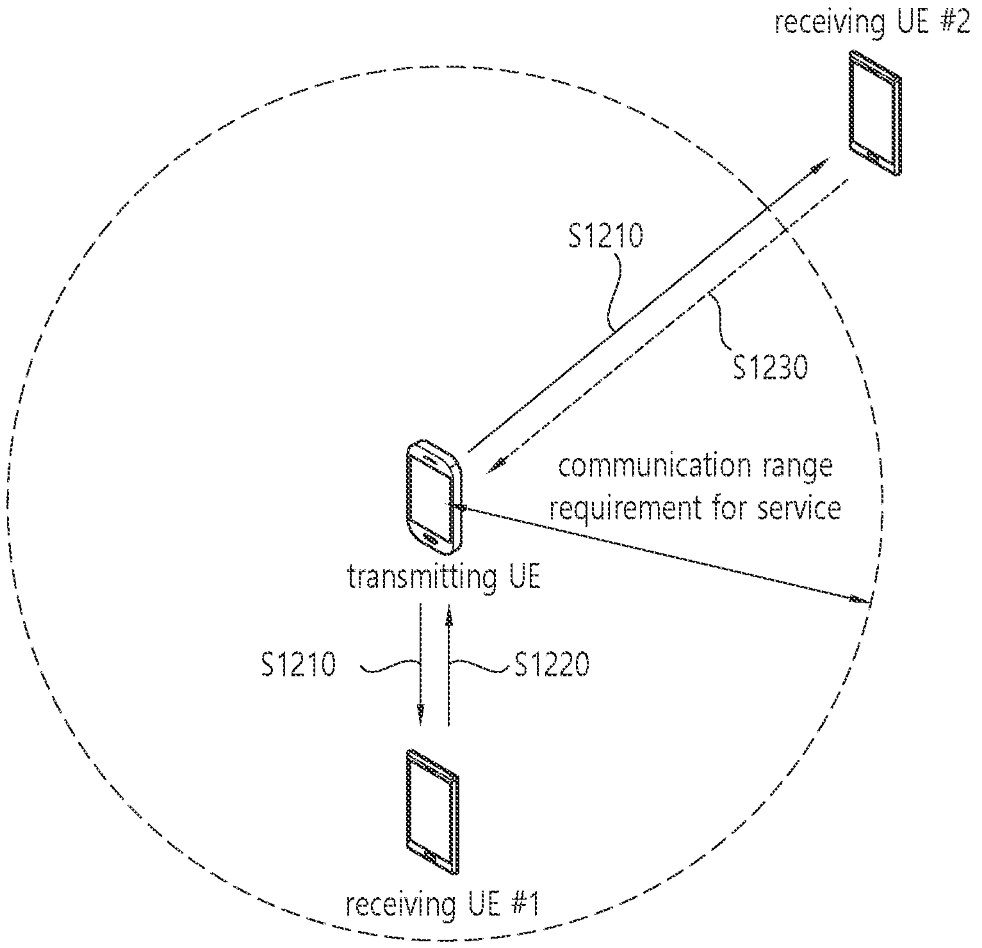
FIG. 12 shows a method for receiving UE(s) to perform SL HARQ feedback operation based on a communication range requirement, based on an embodiment of the present disclosure.

FIG. 12 shows a method for receiving UE(s) to perform SL HARQ feedback operation based on a communication range requirement, based on an embodiment of the present disclosure. The embodiment of FIG. 12 may be combined with various embodiments of the present disclosure.

Referring to FIG. 12, in step S1210, a transmitting UE may transmit a PSCCH and/or a PSSCH. For example, the transmitting UE may transmit service(s)/packet(s) to a receiving UE #1 and a receiving UE #2 through the PSCCH and/or the PSSCH. Additionally, the transmitting UE may transmit location information of the transmitting UE to the receiving UE #1 and the receiving UE #2 through the PSCCH and/or the PSSCH. For example, location information of the transmitting UE may be included in the $2^{nd}$ SCI transmitted through the PSSCH. In the embodiment of FIG. 12, it is assumed that the receiving UE #1 is located within a communication range requirement related to service(s)/packet(s) of the transmitting UE, and the receiving UE #2 is located outside the communication range requirement related to service(s)/packet(s) of the transmitting UE.

In this case, the receiving UE #1 may obtain a distance between the receiving UE #1 and the transmitting UE based on location information of the receiving UE #1 and location information of the transmitting UE. In addition, if the distance is less than or equal to the communication range requirement related to service(s)/packet(s), in step S1220, the receiving UE #1 may perform SL HARQ feedback operation.

Similarly, the receiving UE #2 may obtain a distance between the receiving UE #2 and the transmitting UE based on location information of the receiving UE #2 and location information of the transmitting UE. In addition, if the distance is greater than the communication range requirement related to service(s)/packet(s), in step S1230, the receiving UE #2 may not perform SL HARQ feedback operation. That is, the receiving UE #2 may not transmit SL HARQ feedback for the service(s)/packet(s) to the transmitting UE.

For the above reasons, receiving UE(s) needs to efficiently obtain the location of the transmitting UE. Hereinafter, based on various embodiments of the present disclosure, a method for a transmitting UE to efficiently transmit location information of the transmitting UE and an apparatus supporting the same will be described.

Based on an embodiment of the present disclosure, the transmitting UE may transmit location information of the transmitting UE. In this case, from the viewpoint of a receiving UE, if it is determined that ambiguity/inaccuracy of the location of itself (i.e., the transmitting UE) will be greater (than a pre-configured threshold error value), the transmitting UE may transmit location information of the transmitting UE by using a relatively large pre-configured payload size (or number of bits). For example, if the transmitting UE transmitting location information determines that the receiving UE will not be able to accurately determine the location of the transmitting UE, the transmitting UE may transmit location information of the transmitting UE by using a relatively large pre-configured payload size (or number of bits). Herein, for example, in order to implement the above operation, SCI fields used by the transmitting UE to transmit location information of the transmitting UE may be (pre-)configured to two types or two sizes.

For example, even if the transmitting UE transmits location information of the transmitting UE to the receiving UE through a field with a relatively small payload size (or number of bits) (hereinafter, SHORT_FIELD), the transmitting UE may determine that the receiving UE can accurately determine the location of the transmitting UE (above a pre-configured threshold level). In this case, the transmitting UE may select SHORT_FIELD for transmission of location information. In addition, the transmitting UE may transmit location information of the transmitting UE through SHORT_FIELD.

On the other hand, for example, if the transmitting UE transmits location information of the transmitting UE to the receiving UE through SHORT_FIELD, the transmitting UE may determine that the receiving UE cannot accurately determine the location of the transmitting UE (above a pre-configured threshold level). In this case, the transmitting UE may select a field with a relatively large payload size (or number of bits) (hereinafter, LONG_FIELD) for transmission of location information. For example, the transmitting UE may select LONG_FIELD for transmission of location information in a zone to which the transmitting UE belongs. In addition, the transmitting UE may transmit location information of the transmitting UE through LONG_FIELD.

Herein, for example, in case that the number of zones that can be considered as a zone to which the transmitting UE belongs is greater (than a pre-configured threshold) if the transmitting UE transmits location information of the transmitting UE to the receiving UE through SHORT_FIELD, the transmitting UE may determine that the receiving UE cannot accurately determine the location of the transmitting UE (above a pre-configured threshold level) based on SHORT_FIELD. For example, if the transmitting UE transmits location information of the transmitting UE to the receiving UE through SHORT_FIELD, location information of the transmitting UE may be quantized due to a relatively small payload size (or the number of bits), and due to this, inaccuracy of location information of the transmitting UE may be greater (than a pre-configured allowable threshold level). In this case, the transmitting UE may determine that the receiving UE cannot accurately determine the location of the transmitting UE (above a pre-configured threshold level) based on SHORT_FIELD.

Herein, as another example for implementing the operation, the transmitting UE may transmit location information (e.g., most significant bit (MSB)) of the transmitting UE based on a (always) fixed (relatively small) payload size (or number of bits) through a (pre-configured) field (hereinafter, F_DFIELD) on the $1^{st}$ SCI. In addition, the transmitting UE may transmit (additional) information (e.g., least significant bit (LSB)) that can increase accuracy (related to location information of the transmitting UE) through a (pre-configured) field (hereinafter, S_DFIELD) on the $2^{nd}$ SCI. Herein, for example, only if the transmitting UE determines that location accuracy of the transmitting UE cannot be guaranteed (above a pre-configured threshold level) only by transmitting F_DFIELD on the $1^{st}$ SCI, the transmitting UE may include S_DFIELD in the $2^{nd}$ SCI. For example, only if the transmitting UE determines that location accuracy of the transmitting UE cannot be guaranteed (above a pre-configured threshold level) only by transmitting F_DFIELD on the $1^{st}$ SCI, the transmitting UE may transmit the $2^{nd}$ SCI including S_DFIELD. In addition, the transmitting UE may indicate/inform whether or not S_DFIELD exists in the $2^{nd}$ SCI or whether or not S_DFIELD is transmitted by being included in the $2^{nd}$ SCI through a field on the $1^{st}$ SCI. For example, the field on the $1^{st}$ SCI may be a pre-configured field. For example, the field on the $1^{st}$ SCI may be a pre-configured new field. For example, the transmitting UE may indicate/inform whether or not S_DFIELD exists in the $2^{nd}$ SCI or whether or not S_DFIELD is transmitted by being included in the $2^{nd}$ SCI through a 1-bit field in the $1^{st}$ SCI.

Based on an embodiment of the present disclosure, in order to prevent an excessive increase in the size of the SCI payload, the transmitting UE may transmit (pre-configured) partial bits (e.g., MSB) (hereinafter, DIS_MSB) related to location information through the PSSCH. For example, the transmitting UE may transmit DIS_MSB through the PSSCH based on a pre-configured period and/or the pre-configured frequency. In addition, the transmitting UE may transmit the remaining bits (e.g., LSB) (hereinafter, DIS_LSB) through the PSCCH (or the SCI). Herein, in this case, for example, if the receiving UE does not receive DIS_MSB and only receives DIS_LSB (for a pre-configured time), the receiving UE may calculate/derive the location of the transmitting UE by assuming/using the (successfully) received DIS_MSB at the previous nearest time point. For example, if the receiving UE does not receive DIS_MSB and only receives DIS_LSB (for a pre-configured time), the receiving UE may calculate/derive the location of the transmitting UE by assuming/using DIS_MSB related to the nearest zone or the nearest area from the receiving UE's point of view. For example, if the receiving UE does not receive DIS_MSB and only receives DIS_LSB (for a pre-configured time), the receiving UE may calculate/derive the location of the transmitting UE by assuming/using DIS_MSB related to a zone or an area to which the transmitting UE belongs, which is derived based on the (successfully) received DIS_MSB/DIS_LSB at the previous nearest time point. For example, if the receiving UE does not receive DIS_MSB and only receives DIS_LSB (for a pre-configured time), the receiving UE may calculate/derive the location of the transmitting UE by assuming/using DIS_MSB related to the nearest zone or the nearest area from the location of the receiving UE among previously derived locations of the transmitting UE.

Based on an embodiment of the present disclosure, the following cases may exist. In the following case, the receiving UE may derive/assume the location of the transmitting UE based on the method/rule proposed below.

(1) CASE #A: For example, the transmitting UE may represent/indicate the location of the transmitting UE as an index/parameter related to a zone or an area (based on a pre-configured size).

(2) CASE #B: For example, location information transmitted by the transmitting UE may be quantized due to a limited payload size (or number of bits), and the like. For example, an error may be included in location information of the transmitting UE estimated by the transmitting UE. For example, in a situation in which GNSS (synchronization) quality is lower than a pre-configured threshold level, an error may be included in location information of the transmitting UE estimated by the transmitting UE.

For example, in the case of CASE #A, the receiving UE may derive/assume a distance between the transmitting UE and itself (i.e., the receiving UE) based on a point in a zone or an area to which the transmitting UE belongs. For example, the point may be a nominal point. For example, the point may be a pre-configured point. Herein, for example, the point may be defined as a central point in the zone or the area. For example, the point may be defined as a pre-configured (reference) point in the zone or the area. For example, the point may be defined as a point farthest from the receiving UE among a plurality of points in the zone or the area. For example, the point may be defined as a point nearest to the receiving UE among a plurality of points in the zone or the area. For example, the point may be defined as a point in the nearest zone or the nearest area from the receiving UE among the zones or areas.

Hereinafter, a method for the receiving UE to obtain the distance between the receiving UE and the transmitting UE will be described in detail with reference to FIGS. 13 to 16.

Figure 13:
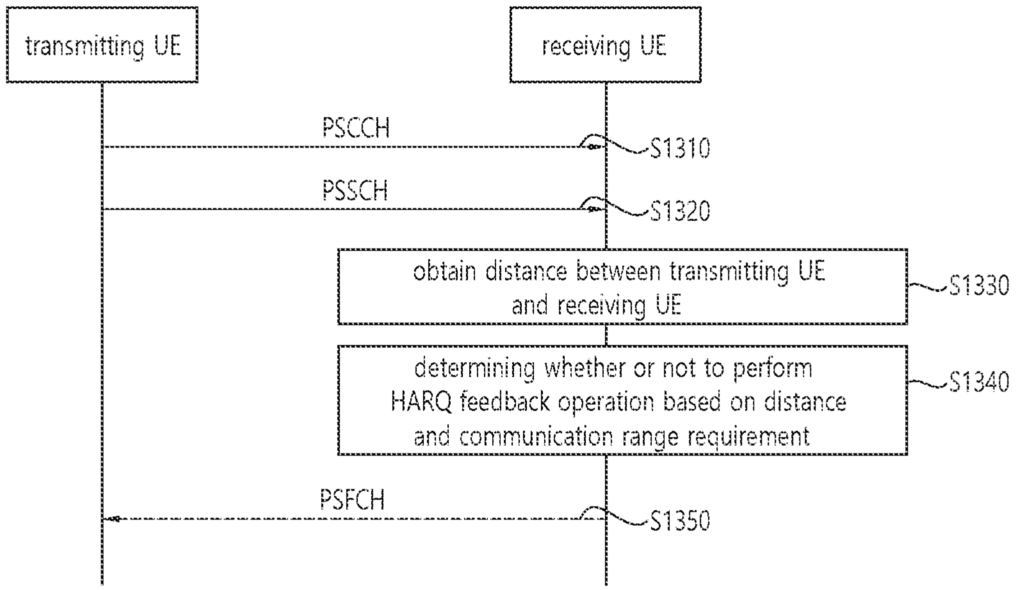
FIG. 13 shows a procedure for a receiving UE to perform HARQ operation based on a distance from a transmitting UE, based on an embodiment of the present disclosure.

FIG. 13 shows a procedure for a receiving UE to perform HARQ operation based on a distance from a transmitting UE, based on an embodiment of the present disclosure. The embodiment of FIG. 13 may be combined with various embodiments of the present disclosure.

Referring to FIG. 13, in step S1310, a transmitting UE may transmit a PSCCH. In step S1320, the transmitting UE may transmit a PSSCH related to the PSCCH. For example, the transmitting UE may transmit a $1^{st}$ SCI through the PSCCH, and the transmitting UE may transmit a $2^{nd}$ SCI through the PSSCH. Also, the transmitting UE may transmit service(s)/packet(s) through the PSSCH. For example, the $2^{nd}$ SCI may include zone-related information and a communication range requirement (i.e., MIN_RANGE). For example, the zone-related information may be a zone ID. For example, the receiving UE receiving the $2^{nd}$ SCI may obtain information related to the communication range requirement related to the service(s)/packet(s) and information related to a zone to which the transmitting UE belongs.

In step S1330, the receiving UE may obtain a distance between the receiving UE and the transmitting UE based on its location (i.e., the location of the receiving UE) and information related to the zone to which the transmitting UE belongs. For example, the receiving UE may obtain the distance between the location of the receiving UE and a central point of the zone to which the transmitting UE belongs. For example, the receiving UE may obtain the distance between (i) the location of the receiving UE and (ii) a central point nearest to the location of the receiving UE among central points of a plurality of zones corresponding to the information related to the zone. That is, regardless of an actual location of the transmitting UE, the receiving UE may obtain the distance between the receiving UE and the transmitting UE by using the location of the receiving UE and the central point of the zone to which the transmitting UE belongs. A method for the receiving UE to obtain the distance between the receiving UE and the transmitting UE will be described in more detail with reference to FIGS. 14 to 16.

Figure 14:
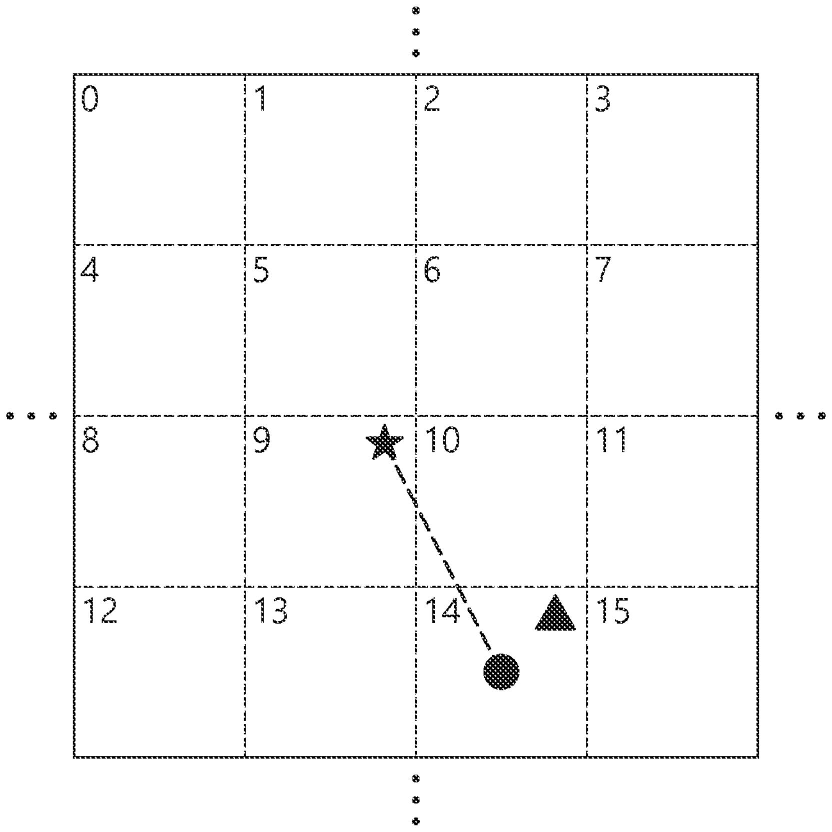
FIG. 14 shows a method for a receiving UE to obtain a distance between the receiving UE and a transmitting UE, based on an embodiment of the present disclosure.

FIG. 14 shows a method for a receiving UE to obtain a distance between the receiving UE and a transmitting UE, based on an embodiment of the present disclosure. The embodiment of FIG. 14 may be combined with various embodiments of the present disclosure.

Referring to FIG. 14, it is assumed that the transmitting UE informs the receiving UE that zone ID=14 through the $2^{nd}$ SCI. In this case, the receiving UE may obtain a distance between a location of the receiving UE and a central point of a zone corresponding to zone ID=14. That is, regardless of an actual location of the transmitting UE, the receiving UE may assume or determine the distance between the location of the receiving UE and the central point of the zone corresponding to zone ID=14 as the distance between the receiving UE and the transmitting UE.

Figure 15:
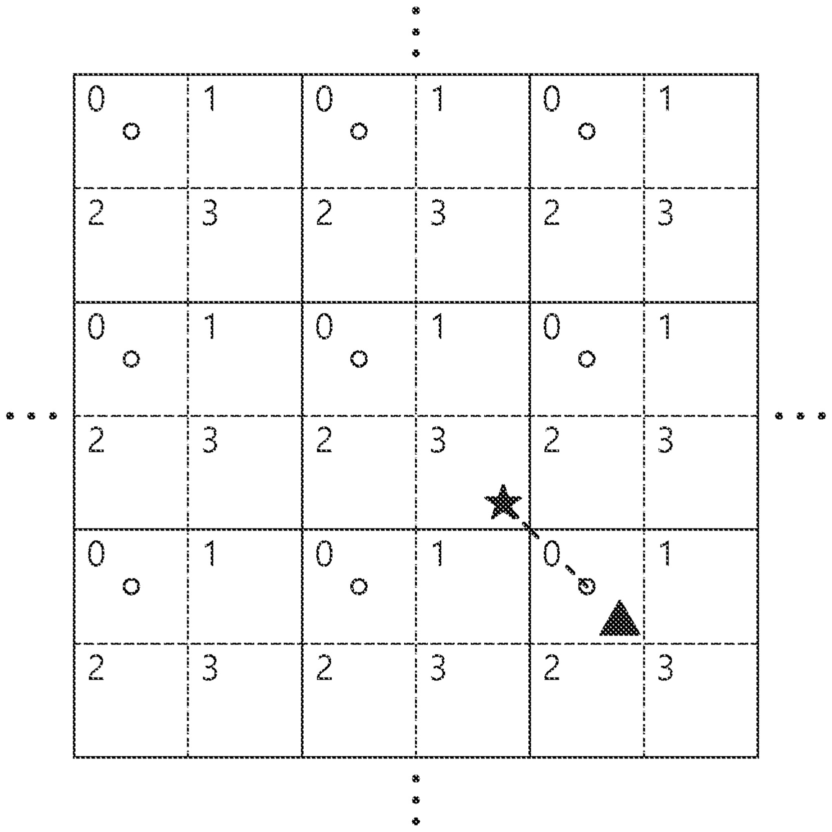
FIG. 15 and FIG. 16 show a method for a receiving UE to obtain a distance between the receiving UE and a transmitting UE in case that a plurality of zones with the same zone ID exist around the receiving UE, based on an embodiment of the present disclosure.
Figure 16:
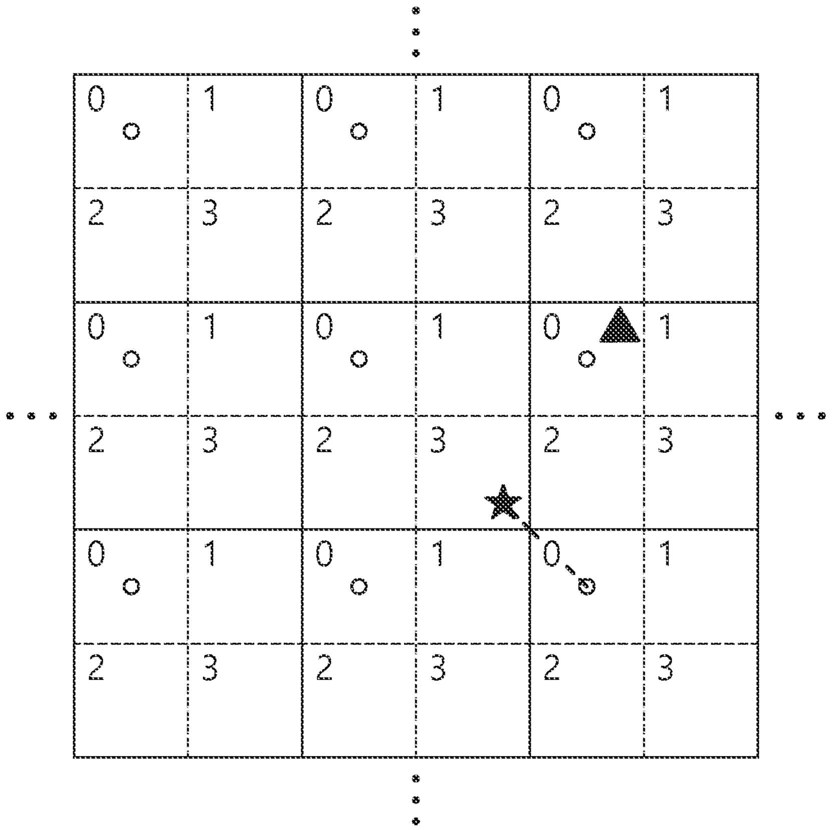

FIG. 15 and FIG. 16 show a method for a receiving UE to obtain a distance between the receiving UE and a transmitting UE in case that a plurality of zones with the same zone ID exist around the receiving UE, based on an embodiment of the present disclosure. FIG. 15 and FIG. 16 may be combined with various embodiments of the present disclosure.

Referring to FIG. 15 and FIG. 16, it is assumed that the transmitting UE informs the receiving UE that the zone ID=0 through the $2^{nd}$ SCI. In this case, the receiving UE may obtain a distance between (i) a location of the receiving UE and (ii) the nearest central point among the central points of a plurality of zones corresponding to zone ID=0. That is, regardless of an actual location of the transmitting UE, the receiving UE may assume or determine the distance between (i) the location of the receiving UE and (ii) the nearest central point among the central points of a plurality of zones corresponding to zone ID=0 as the distance between the receiving UE and the transmitting UE.

Alternatively, the receiving UE may obtain a distance between (i) a location of the receiving UE and (ii) a central point of the nearest zone among a plurality of zones corresponding to zone ID=0. That is, regardless of an actual location of the transmitting UE, the receiving UE may assume or determine the distance between (i) the location of the receiving UE and (ii) a central point of the nearest zone among a plurality of zones corresponding to zone ID=0 as the distance between the receiving UE and the transmitting UE.

Referring back to FIG. 13, in step S1340, the receiving UE may compare the distance obtained in step S1330 with the communication range requirement related to the service(s)/packet(s). For example, the receiving UE may determine whether or not to perform HARQ feedback operation based on the distance and the communication range requirement.

For example, if the distance is less than or equal to the communication range requirement, the receiving UE may perform HARQ feedback operation. Herein, for example, in the case of the receiving UE configured with HARQ feedback operation based on the groupcast option 1, in step S1350, the receiving UE which has failed to decode the PSSCH may transmit NACK information to the transmitting UE through a PSFCH. For example, in the case of the receiving UE configured with HARQ feedback operation based on the groupcast option 1, the receiving UE which has succeeded in decoding the PSSCH may not transmit ACK information to the transmitting UE through a PSFCH. For example, the PSFCH may be a feedback channel related to the PSCCH and/or the PSSCH.

For example, if the distance is greater than the communication range requirement, the receiving UE may not perform HARQ feedback operation. In this case, the receiving UE may not transmit HARQ feedback to the transmitting UE regardless of whether or not the PSSCH has been decoded.

For example, in the case of CASE #B, the receiving UE may derive/assume a distance between the transmitting UE and itself (i.e., the receiving UE) based on a point in a zone or an area to which the transmitting UE belongs. For example, the point may be a nominal point. For example, the point may be a pre-configured point. Herein, for example, the point may be defined as a central point in the zone or the area. For example, the point may be defined as a pre-configured (reference) point in the zone or the area. For example, the point may be defined as a point farthest from the receiving UE among a plurality of points in the zone or the area. For example, the point may be defined as a point nearest to the receiving UE among a plurality of points in the zone or the area.

For example, in the case of CASE #B, the receiving UE (which receives location information from the transmitting UE) may (again) derive a possible location of the transmitting UE based on a pre-configured error value. For example, in the case of CASE #B, the receiving UE (which receives location information from the transmitting UE) may (again) derive a possible location of the transmitting UE based on a pre-configured error range. For example, in the case of CASE #B, the receiving UE (which receives location information from the transmitting UE) may (again) derive a possible location of the transmitting UE based on a pre-configured quantization level. For example, in the case of CASE #B, the receiving UE (which receives location information from the transmitting UE) may (again) derive a possible location of the transmitting UE based on a pre-configured quantization error. Thereafter, the receiving UE may transmit SL HARQ feedback if at least one distance among distances between a location of the receiving UE and possible locations of the transmitting UE is less than or equal to MIN_RANGE.

For example, in the case of CASE #A, the receiving UE (which receives location information from the transmitting UE) may (again) derive a possible location of the transmitting UE based on a pre-configured error value. For example, in the case of CASE #A, the receiving UE (which receives location information from the transmitting UE) may (again) derive a possible location of the transmitting UE based on a pre-configured error range. For example, in the case of CASE #A, the receiving UE (which receives location information from the transmitting UE) may (again) derive a possible location of the transmitting UE based on a pre-configured quantization level. For example, in the case of CASE #A, the receiving UE (which receives location information from the transmitting UE) may (again) derive a possible location of the transmitting UE based on a pre-configured quantization error. Thereafter, the receiving UE may transmit SL HARQ feedback if at least one distance among distances between a location of the receiving UE and possible locations of the transmitting UE is less than or equal to MIN_RANGE.

Based on an embodiment of the present disclosure, an upper layer (e.g., an application layer and/or a V2X layer) of a UE may provide MIN_RANGE information, which is a service/packet-related requirement, to a lower layer (e.g., AS layer, PHY layer, MAC layer, RRC layer). In this case, in consideration of the proposed quantization level/error and/or location information (estimated) error, the upper layer of the UE may add a (pre-configured) margin/offset value to MIN_RANGE information and transfer it to the lower layer. Herein, for example, the margin/offset value may be configured differently for the UE based on accuracy of location information (of another UE or of the UE itself known by the UE). For example, the margin/offset value may be configured differently for the UE based on a type of a service. For example, the margin/offset value may be configured differently for the UE based on a priority of a service. For example, the margin/offset value may be configured differently for the UE based on a service requirement (e.g., reliability and/or latency). For example, if inaccuracy is greater than a pre-configured threshold level, the UE may add a relatively large margin/offset value to MIN_RANGE information. For example, if inaccuracy is not greater than a pre-configured threshold level, the UE may add a relatively small margin/offset value (e.g., including 0) to MIN_RANGE information.

Based on an embodiment of the present disclosure, the transmitting UE can efficiently transmit its location information to the receiving UE. Furthermore, the transmitting UE may more accurately inform the receiving UE of its location.

Based on an embodiment of the present disclosure, the receiving UE may perform (groupcast) SL HARQ feedback operation based on the TX-RX distance. For example, in the (groupcast) SL HARQ feedback operation based on the TX-RX distance, after the receiving UE decodes a PSCCH targeting the receiving UE, if the receiving UE fails to decode a PSSCH related to the PSCCH, the receiving UE may transmit HARQ-NACK to the transmitting UE through a PSFCH. On the other hand, after the receiving UE decodes a PSCCH targeting the receiving UE, if the receiving UE successfully decodes a PSSCH related to the PSCCH, the receiving UE may not transmit HARQ-ACK to the transmitting UE. For convenience of description, the above-described feedback operation of the receiving UE may be referred to as NACK ONLY feedback operation.

For example, in the (groupcast) SL HARQ feedback operation based on the TX-RX distance, the receiving UE may obtain or determine information related to the distance between the receiving UE and the transmitting UE based on the location of the receiving UE and the location of the transmitting UE. In addition, the receiving UE may perform NACK ONLY feedback operation based on the information related to the distance. For example, if the distance between the receiving UE and the transmitting UE is equal to or less than the minimum required communication range related to packet(s) or service(s) transmitted by the transmitting UE, the receiving UE may perform NACK ONLY feedback operation for the transmitting UE. For example, if the distance between the receiving UE and the transmitting UE is equal to or greater than the minimum required communication range related to packet(s) or service(s) transmitted by the transmitting UE, the receiving UE may not transmit HARQ feedback to the transmitting UE. For example, the transmitting UE may transmit packet(s) or service(s) to the receiving UE through a PSCCH and/or a PSSCH.

For example, in the (groupcast) SL HARQ feedback operation based on the TX-RX distance, it may be impossible for the receiving UE to obtain its own location information. In addition, in this case, the receiving UE may receive packet(s) or service(s) with a priority higher than a pre-configured threshold (P_THD) from the transmitting UE. Alternatively, the receiving UE may receive packet(s) or service(s) with a priority higher than or equal to P_THD from the transmitting UE. In this case, for example, the receiving UE may transmit HARQ feedback for the packet(s) or the service(s) to the transmitting UE based on NACK ONLY feedback operation. For example, if the receiving UE fails to decode the packet(s) or the service(s), the receiving UE may transmit NACK information to the transmitting UE. For example, if the receiving UE succeeds in decoding the packet(s) or the service(s), the receiving UE may not transmit ACK information to the transmitting UE. For example, the receiving UE may omit HARQ feedback for the transmitting UE.

For example, in the (groupcast) SL HARQ feedback operation based on the TX-RX distance, it may be impossible for the receiving UE to obtain its own location information. In addition, in this case, the receiving UE may receive packet(s) or service(s) with a priority lower than P_THD from the transmitting UE. Alternatively, the receiving UE may receive packet(s) or service(s) with a priority lower than or equal to P_THD from the transmitting UE. In this case, for example, the receiving UE may not transmit HARQ feedback for the packet(s) or the service(s) to the transmitting UE. For example, the receiving UE may omit HARQ feedback for the transmitting UE.

For example, in the (groupcast) SL HARQ feedback operation based on the TX-RX distance, accuracy of location information of the receiving UE obtained by the receiving UE may be lower than a pre-configured threshold accuracy value. In addition, in this case, the receiving UE may receive packet(s) or service(s) with a priority higher than P_THD from the transmitting UE. Alternatively, the receiving UE may receive packet(s) or service(s) with a priority higher than or equal to P_THD from the transmitting UE. In this case, for example, the receiving UE may transmit HARQ feedback for the packet(s) or the service(s) to the transmitting UE based on NACK ONLY feedback operation. For example, if the receiving UE fails to decode the packet(s) or the service(s), the receiving UE may transmit NACK information to the transmitting UE. For example, if the receiving UE succeeds in decoding the packet(s) or the service(s), the receiving UE may not transmit ACK information to the transmitting UE. For example, the receiving UE may omit HARQ feedback for the transmitting UE.

For example, in the (groupcast) SL HARQ feedback operation based on the TX-RX distance, accuracy of location information of the receiving UE obtained by the receiving UE may be lower than a pre-configured threshold accuracy value. In addition, in this case, the receiving UE may receive packet(s) or service(s) with a priority lower than P_THD from the transmitting UE. Alternatively, the receiving UE may receive packet(s) or service(s) with a priority lower than or equal to P_THD from the transmitting UE. In this case, for example, the receiving UE may not transmit HARQ feedback for the packet(s) or the service(s) to the transmitting UE. For example, the receiving UE may omit HARQ feedback for the transmitting UE.

For example, P_THD value may be configured differently for the UE based on a congestion level of a resource pool and/or a minimum communication range requirement.

Based on an embodiment of the present disclosure, in the case of SL HARQ feedback operation (e.g., NACK ONLY) based on the TX-RX distance, based on the following rule, the transmitting UE may indicate/inform the receiving UE to perform SL HARQ feedback operation without considering the TX-RX distance. For example, in the case of SL HARQ feedback operation (e.g., NACK ONLY) based on the TX-RX distance, based on the following rule, the transmitting UE may indicate/inform the receiving UE to disable the SL HARQ feedback operation based on the TX-RX distance.

For example, if a minimum communication range field and/or a zone ID field related to the transmitting UE defined in the ($2^{nd}$) SCI transmitted by the transmitting UE to the receiving UE indicates a pre-configured specific state and/or value, the receiving UE may determine that SL HARQ feedback operation without consideration of the TX-RX distance (e.g., NACK ONLY) is triggered (e.g., a situation in which zone ID information to which the transmitting UE belongs in the $2^{nd}$ SCI transmitted by the transmitting UE is transmitted). For example, if a minimum communication range field and/or a zone ID field related to the transmitting UE defined in the ($2^{nd}$) SCI transmitted by the transmitting UE to the receiving UE indicates a pre-configured specific state and/or value, the receiving UE may determine that SL HARQ feedback operation based on the TX-RX distance is disabled. Specifically, for example, if the minimum communication range field included in the ($2^{nd}$) SCI indicates a pre-configured infinity value (or zero value), the (target) receiving UE that has received the ($2^{nd}$) SCI may transmit NACK information to the transmitting UE (e.g., NACK ONLY feedback operation) without considering the TX-RX distance if PSSCH decoding has been failed. Additionally/alternatively, for example, even if the receiving UE fails to decode the PSSCH, the receiving UE may not transmit SL HARQ feedback (e.g., NACK) to the transmitting UE.

For example, if the transmitting UE determines that its location information is available, and/or if the transmitting UE determines its location information with accuracy greater than or equal to a pre-configured threshold, the transmitting UE may designate or determine the minimum communication range field and/or the zone ID field related to the transmitting UE defined in the ($2^{nd}$) SCI as a value other than the specific state or the value (e.g., infinity or zero) (described above). In addition, the transmitting UE may transmit the ($2^{nd}$) SCI to the receiving UE. Accordingly, the transmitting UE may allow/indicate the receiving UE to use or apply only SL HARQ feedback operation based on the TX-RX distance (e.g., NACK ONLY).

For example, if the transmitting UE determines that its location information is not available, and/or if the transmitting UE determines its location information with accuracy less than or equal to a pre-configured threshold, the transmitting UE may designate or determine the minimum communication range field and/or the zone ID field related to the transmitting UE defined in the ($2^{nd}$) SCI as the specific state or the value (e.g., infinity or zero) (described above). In addition, the transmitting UE may transmit the ($2^{nd}$) SCI to the receiving UE. Accordingly, the transmitting UE may allow/indicate the receiving UE to use or apply only SL HARQ feedback operation without considering the TX-RX distance (e.g., NACK ONLY).

Figure 17:
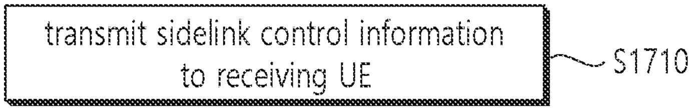
FIG. 17 shows a method for a transmitting UE to transmit location information to a receiving UE, based on an embodiment of the present disclosure.

FIG. 17 shows a method for a transmitting UE to transmit location information to a receiving UE, based on an embodiment of the present disclosure. The embodiment of FIG. 17 may be combined with various embodiments of the present disclosure.

Referring to FIG. 17, in step S1710, the transmitting UE may transmit sidelink control information to the receiving UE. The sidelink control information may include location information of the transmitting UE. The proposed method can be applied to the device(s) described below.

Figure 18:
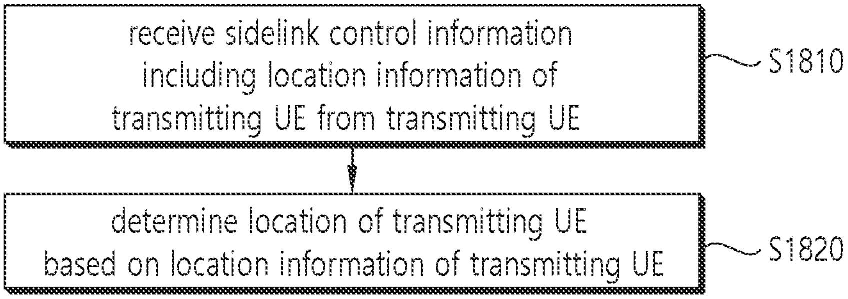
FIG. 18 shows a method for a receiving UE to receive location information from a transmitting UE, based on an embodiment of the present disclosure.

FIG. 18 shows a method for a receiving UE to receive location information from a transmitting UE, based on an embodiment of the present disclosure. The embodiment of FIG. 18 may be combined with various embodiments of the present disclosure.

Referring to FIG. 18, in step S1810, the receiving UE may receive sidelink control information including location information of the transmitting UE from the transmitting UE. In step S1820, the receiving UE may determine the location of the transmitting UE based on the location information of the transmitting UE. The proposed method can be applied to the device(s) described below.

Figure 19:
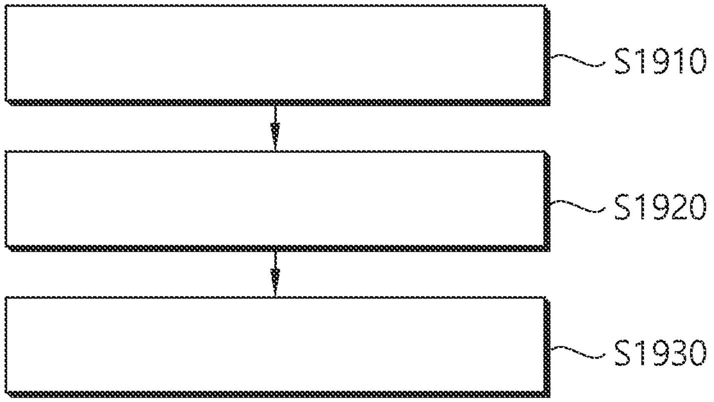
FIG. 19 shows a method for a first device to perform wireless communication, based on an embodiment of the present disclosure.

FIG. 19 shows a method for a first device to perform wireless communication, based on an embodiment of the present disclosure. The embodiment of FIG. 19 may be combined with various embodiments of the present disclosure.

Referring to FIG. 19, in step S1910, the first device may receive, from a second device through a physical sidelink shared channel (PSSCH), information related to a zone. In step S1920, the first device may obtain information related to a distance, based on a central location of the zone and a location of the first device. In step S1930, the first device may determine whether or not to transmit HARQ feedback for the PSSCH to the second device, based on the information related to the distance.

For example, the information related to the zone may include an ID of the zone to which the second device belongs. For example, the central location of the zone may be a central location nearest from the location of the first device among central locations of a plurality of zones related to the ID of the zone. For example, IDs of the plurality of zones may be a same.

For example, the distance may be a distance between the central location of the zone and the location of the first device.

Additionally, for example, the first device may receive information related to a communication range requirement through the PSSCH. Herein, for example, the information related to the communication range requirement may be received through a sidelink control information (SCI) on the PSSCH, and the information related to the zone may be received through the SCI on the PSSCH.

For example, based on the distance being less than or equal to a communication range requirement related to data received through the PSSCH, the first device may determine to transmit the HARQ feedback for the PSSCH to the second device. For example, the HARQ feedback for the PSSCH may be transmitted to the second device, only if the first device fails to receive the PSSCH, and the HARQ feedback may be HARQ NACK.

For example, the first device may determine not to transmit the HARQ feedback for the PSSCH, based on the distance being greater than a communication range requirement related to data received on the PSSCH.

Additionally, for example, the first device may determine that accuracy of location information of the first device is lower than a first threshold value. For example, the first device may determine to transmit the HARQ feedback for the PSSCH to the second device, based on a priority of data received through the PSSCH being higher than a second threshold.

For example, the information related to the zone may be received through a field of a small payload size, based on the second device determining that the first device is able to identify location of the second device with accuracy greater than or equal to a pre-configured threshold level.

For example, the information related to the zone may be received through a field of a large payload size, based on a number of zones determined as the zone to which the second device belongs exceeds a pre-configured threshold.

The proposed method can be applied to device(s) described below. First, the processor 102 of the first device 100 may control the transceiver 106 to receive, from a second device through a physical sidelink shared channel (PSSCH), information related to a zone. In addition, the processor 102 of the first device 100 may obtain information related to a distance, based on a central location of the zone and a location of the first device. In addition, the processor 102 of the first device 100 may determine whether or not to transmit HARQ feedback for the PSSCH to the second device, based on the information related to the distance.

Based on an embodiment of the present disclosure, a first device configured to perform wireless communication may be provided. For example, the first device may comprise: one or more memories storing instructions; one or more transceivers; and one or more processors connected to the one or more memories and the one or more transceivers. For example, the one or more processors may execute the instructions to: receive, from a second device through a physical sidelink shared channel (PSSCH), information related to a zone; obtain information related to a distance, based on a central location of the zone and a location of the first device; and determine whether or not to transmit HARQ feedback for the PSSCH to the second device, based on the information related to the distance.

Based on an embodiment of the present disclosure, an apparatus configured to control a first user equipment (UE) performing wireless communication may be provided. For example, the apparatus may comprise: one or more processors; and one or more memories operably connected to the one or more processors and storing instructions. For example, the one or more processors may execute the instructions to: receive, from a second UE through a physical sidelink shared channel (PSSCH), information related to a zone; obtain information related to a distance, based on a central location of the zone and a location of the first UE; and determine whether or not to transmit HARQ feedback for the PSSCH to the second UE, based on the information related to the distance.

Based on an embodiment of the present disclosure, anon-transitory computer-readable storage medium storing instructions may be provided. For example, the instructions, when executed, may cause a first device to: receive, from a second device through a physical sidelink shared channel (PSSCH), information related to a zone; obtain information related to a distance, based on a central location of the zone and a location of the first device; and determine whether or not to transmit HARQ feedback for the PSSCH to the second device, based on the information related to the distance.

Figure 20:
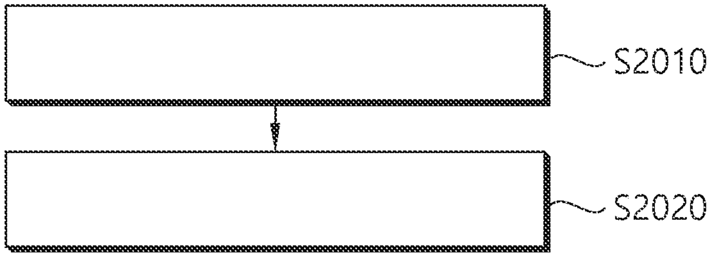
FIG. 20 shows a method for a second device to perform wireless communication, based on an embodiment of the present disclosure.

FIG. 20 shows a method for a second device to perform wireless communication, based on an embodiment of the present disclosure. The embodiment of FIG. 20 may be combined with various embodiments of the present disclosure.

Referring to FIG. 20, in step S2010, the second device may transmit, to a first device through a physical sidelink shared channel (PSSCH), information related to a zone and information related to a communication range requirement. In step S2020, the second device may receive, from the first device, HARQ feedback for the PSSCH. Herein, for example, a distance between the first device and the second device may be obtained based on a central location of the zone and a location of the first device. For example, the distance may be less than or equal to the communication range requirement. For example, the information related to the zone may include an ID of the zone to which the second device belongs. For example, the central location of the zone may be a central location nearest from the location of the first device among central locations of a plurality of zones related to the ID of the zone.

The proposed method can be applied to device(s) described below. First, the processor 202 of the second device 200 may control the transceiver 206 to transmit, to a first device through a physical sidelink shared channel (PSSCH), information related to a zone and information related to a communication range requirement. In addition, the processor 202 of the second device 200 may control the transceiver 206 to receive, from the first device, HARQ feedback for the PSSCH.

Based on an embodiment of the present disclosure, a second device configured to perform wireless communication may be provided. For example, the second device may comprise: one or more memories storing instructions; one or more transceivers; and one or more processors connected to the one or more memories and the one or more transceivers. For example, the one or more processors may execute the instructions to: transmit, to a first device through a physical sidelink shared channel (PSSCH), information related to a zone and information related to a communication range requirement; and receive, from the first device, HARQ feedback for the PSSCH. Herein, for example, a distance between the first device and the second device is obtained based on a central location of the zone and a location of the first device, and the distance may be less than or equal to the communication range requirement.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 21:
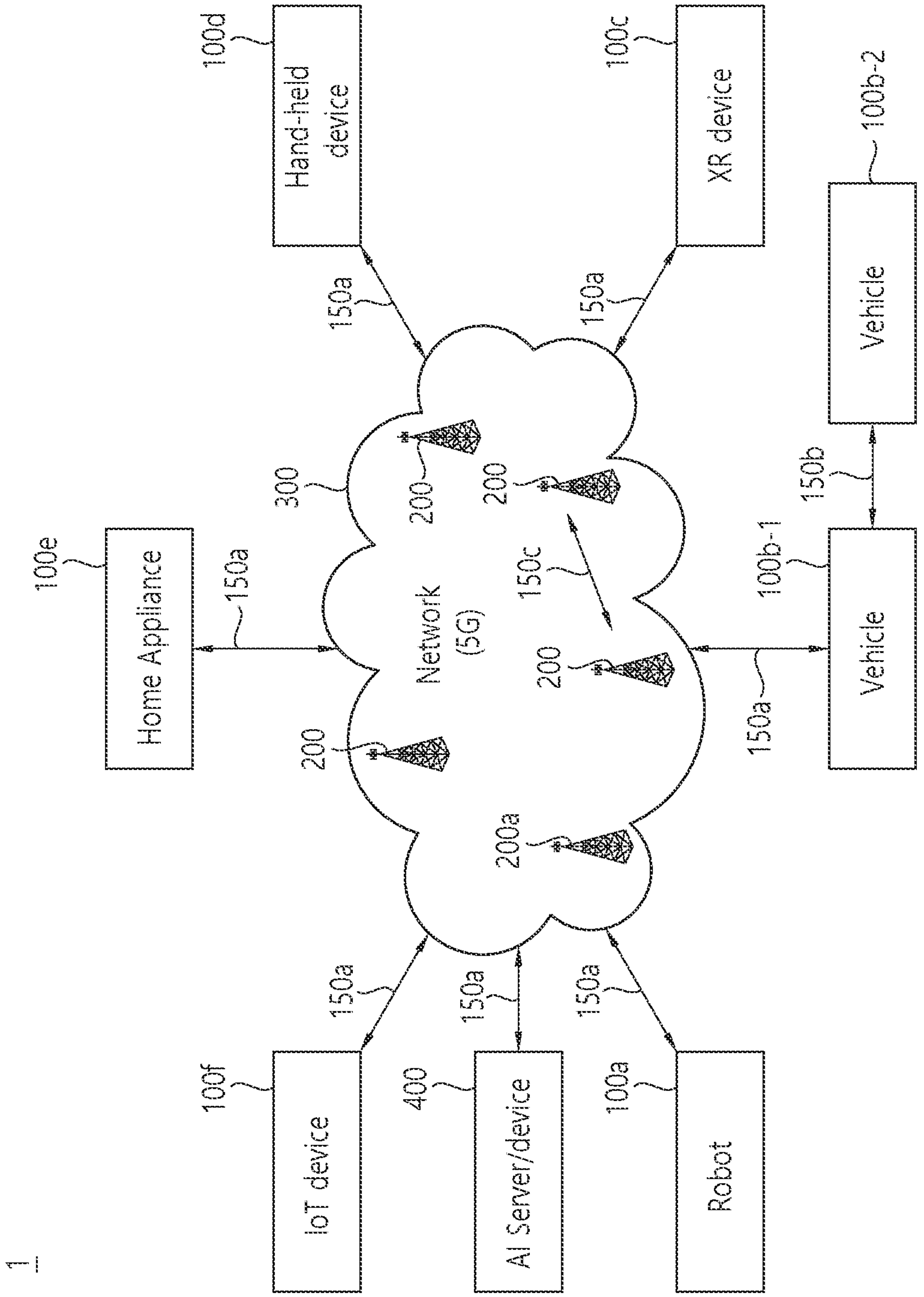
FIG. 21 shows a communication system 1, based on an embodiment of the present disclosure.

FIG. 21 shows a communication system 1, based on an embodiment of the present disclosure.

Referring to FIG. 21, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/ network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g., relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 22:
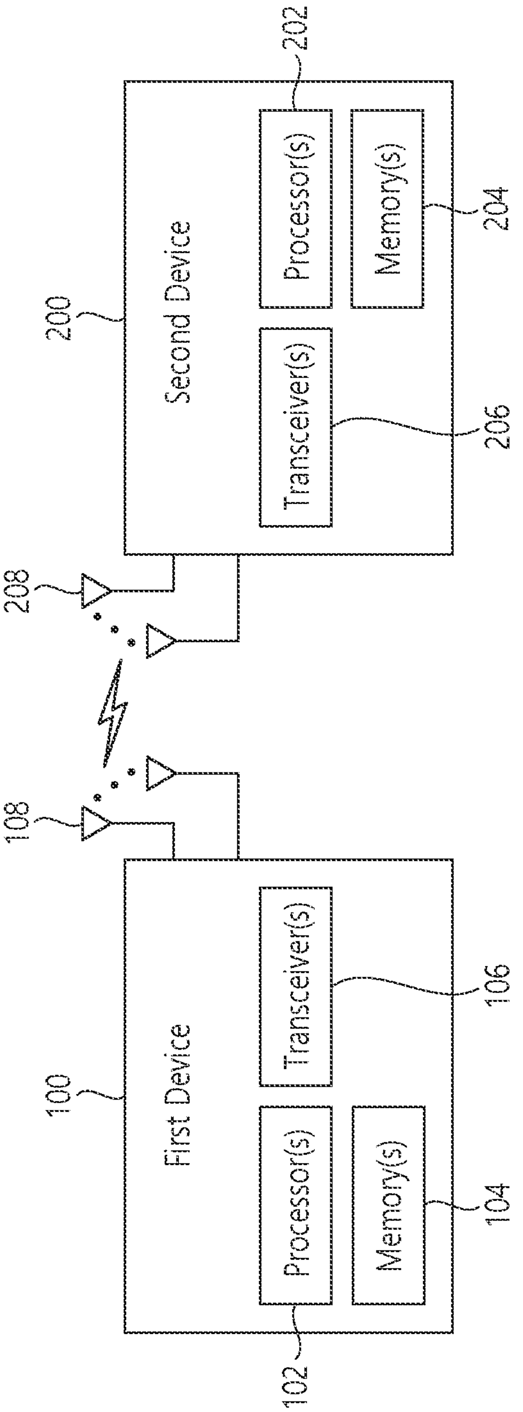
FIG. 22 shows wireless devices, based on an embodiment of the present disclosure.

FIG. 22 shows wireless devices, based on an embodiment of the present disclosure.

Referring to FIG. 22, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 21.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 23:
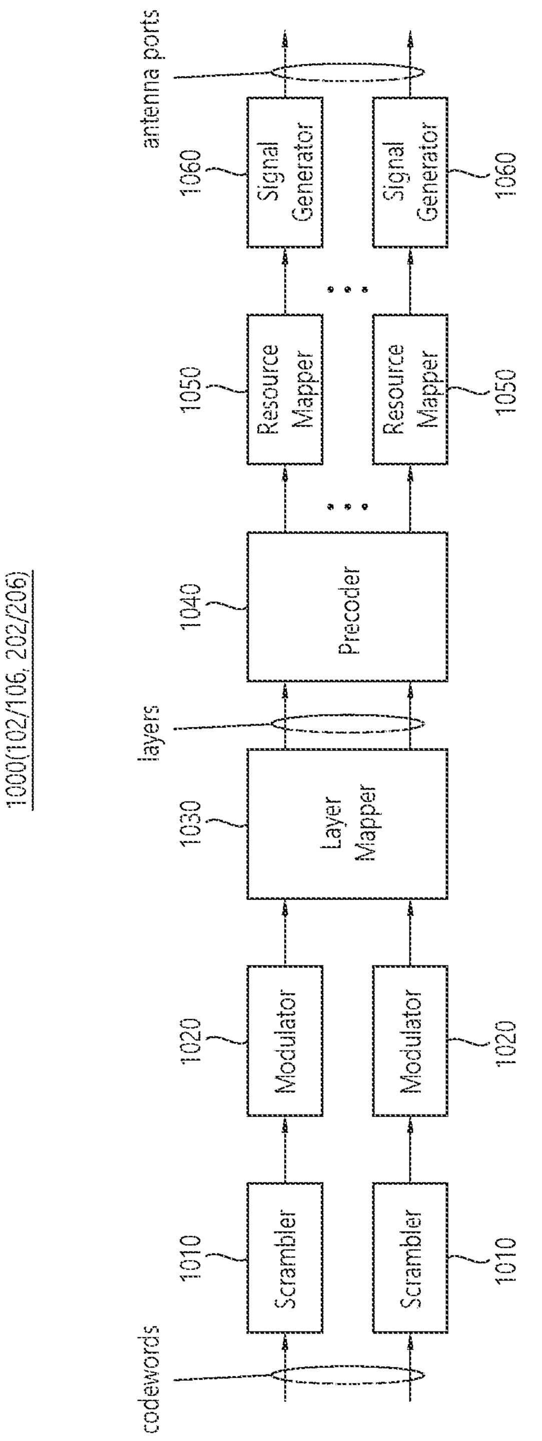
FIG. 23 shows a signal process circuit for a transmission signal, based on an embodiment of the present disclosure.

FIG. 23 shows a signal process circuit for a transmission signal, based on an embodiment of the present disclosure.

Referring to FIG. 23, a signal processing circuit 1000 may include scramblers 1010, modulators 1020, a layer mapper 1030, a precoder 1040, resource mappers 1050, and signal generators 1060. An operation/function of FIG. 23 may be performed, without being limited to, the processors 102 and 202 and/or the transceivers 106 and 206 of FIG. 22. Hardware elements of FIG. 23 may be implemented by the processors 102 and 202 and/or the transceivers 106 and 206 of FIG. 22. For example, blocks 1010 to 1060 may be implemented by the processors 102 and 202 of FIG. 22. Alternatively, the blocks 1010 to 1050 may be implemented by the processors 102 and 202 of FIG. 22 and the block 1060 may be implemented by the transceivers 106 and 206 of FIG. 22.

Codewords may be converted into radio signals via the signal processing circuit 1000 of FIG. 23. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT)

modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 23. For example, the wireless devices (e.g., 100 and 200 of FIG. 22) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 24:
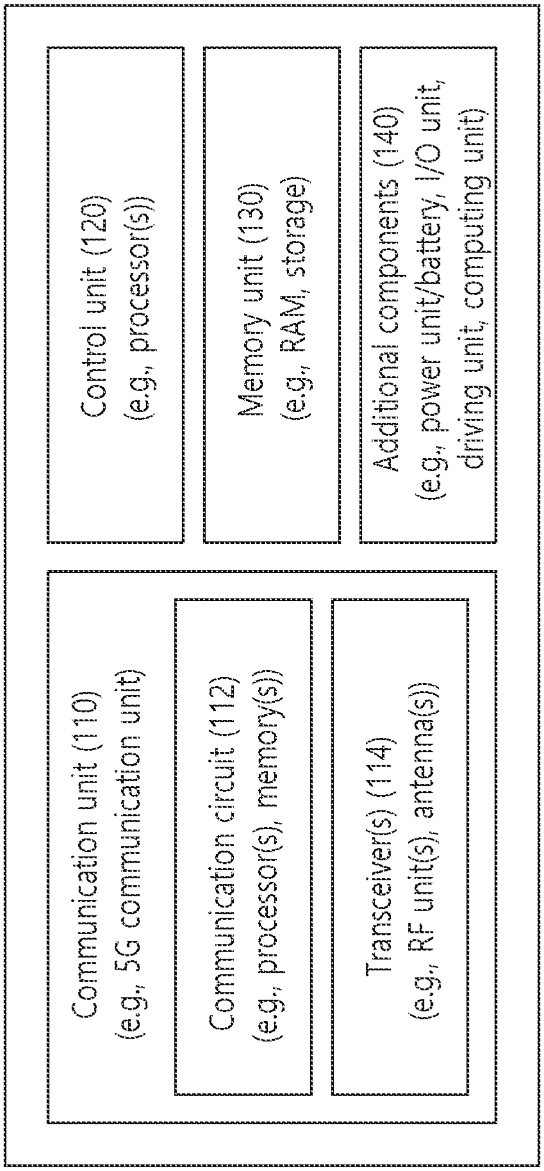
FIG. 24 shows another example of a wireless device, based on an embodiment of the present disclosure.

FIG. 24 shows another example of a wireless device, based on an embodiment of the present disclosure. The wireless device may be implemented in various forms according to a use-case/service (refer to FIG. 21).

Referring to FIG. 24, wireless devices 100 and 200 may correspond to the wireless devices 100 and 200 of FIG. 22 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 22. For example, the transceiver(s) 114 may include the one or more transceivers 106 and 206 and/or the one or more antennas 108 and 208 of FIG. 22. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 21), the vehicles (100*b*-1 and 100*b*-2 of FIG. 21), the XR device (100*c* of FIG. 21), the hand-held device (100*d* of FIG. 21), the home appliance (100*e* of FIG. 21), the IoT device (100*f* of FIG. 21), a digital broadcast terminal, a hologram device, a public safety device, an MTC device, a medicine device, a fintech device (or a finance device), a security device, a climate/environment device, the AI server/device (400 of FIG. 21), the BSs (200 of FIG. 21), a network node, etc. The wireless device may be used in a mobile or fixed place according to a use-example/service.

In FIG. 24, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 24 will be described in detail with reference to the drawings.

Figure 25:
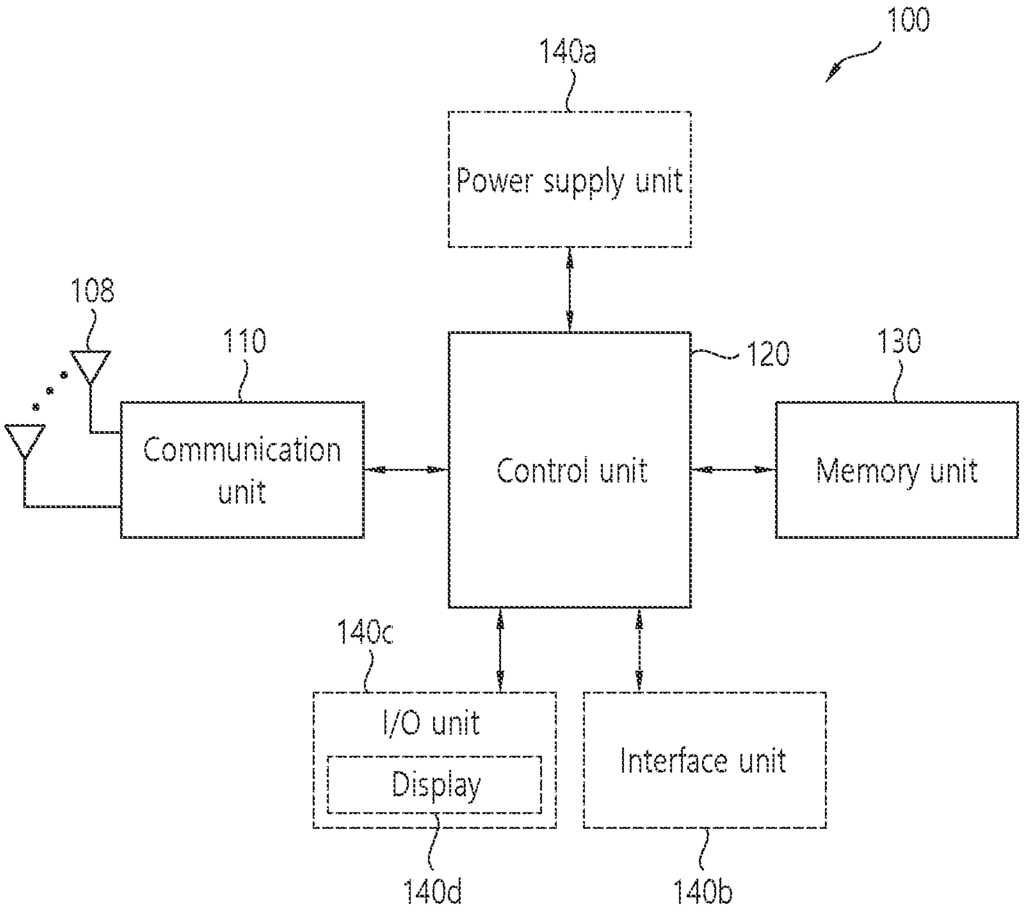
FIG. 25 shows a hand-held device, based on an embodiment of the present disclosure.

FIG. 25 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 25, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 24, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Figure 26:
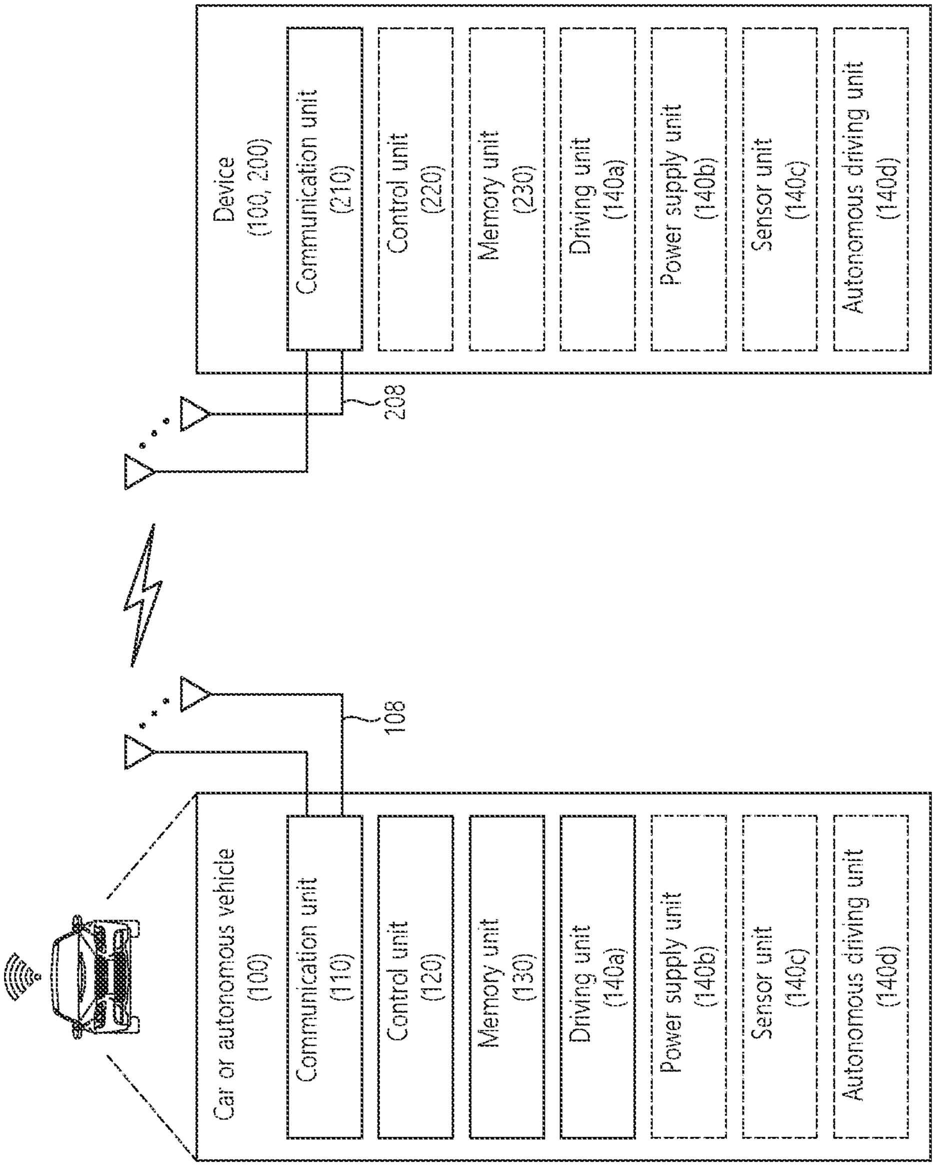
FIG. 26 shows a vehicle or an autonomous vehicle, based on an embodiment of the present disclosure.

FIG. 26 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 26, a vehicle or autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 24, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method, comprising:

receiving, by a first device from a second device, physical sidelink shared channel (PSSCH) data and sidelink control information (SCI) including a zone identity (ID), wherein the SCI is received through a PSSCH;

based on a hybrid automatic repeat request (HARQ) feedback for groupcast being enabled by the SCI, based on a negative-only acknowledgement being indicated by the SCI, based on obtaining a distance between a location of the first device and a central location of a nearest zone that is obtained based on the zone ID included in the SCI, based on the distance being smaller than or equal to a communication range requirement, and based on the first device failing to decode the PSSCH data related to a physical sidelink control channel (PSCCH), generating, by the first device, a negative acknowledgement of the PSSCH data; and transmitting, by the first device to the second device, the negative acknowledgement of the PSSCH data.

2. The method of claim 1, wherein the HARQ feedback includes the negative-only acknowledgement.

3. The method of claim 1, further comprising:

receiving information related to the communication range requirement through the PSSCH, wherein the information related to the communication range requirement is received through the SCI on the PSSCH.

4. The method of claim 1, further comprising:

determining that accuracy of location information of the first device is lower than a first threshold value.

5. The method of claim 4, further comprising:

determining, based on that a priority of data received through the PSSCH is higher than a second threshold, to generate HARQ feedback information for the data received on the PSSCH.

6. The method of claim 1, wherein the zone ID is received through a field of a small and fixed payload size.

7. The method of claim 1, wherein the zone ID is received through a field of a large payload size, based on a number of zones determined as a zone to which the second device belongs exceeding a pre-configured threshold.

8. A first device, comprising:

at least one transceiver;

at least one processor; and at least one memory connected to the at least one processor and storing instructions that, based on being executed by the at least one processor, cause the first device to perform operations comprising:

receiving, by a first device from a second device, physical sidelink shared channel (PSSCH) data and sidelink control information (SCI) including a zone identity (ID), wherein the SCI is received through a PSSCH;

based on a hybrid automatic repeat request (HARQ) feedback for groupcast being enabled by the SCI, based on a negative-only acknowledgement being indicated by the SCI, based on obtaining a distance between a location of the first device and a central location of a nearest zone that is obtained based on the zone ID included in the SCI, based on the distance being smaller than or equal to a communication range requirement, and based on the first device failing to decode the PSSCH data related to a physical sidelink control channel (PSCCH), generating, by the first device, a negative acknowledgement of the PSSCH data; and transmitting, by the first device to the second device, the negative acknowledgement of the PSSCH data.

9. The first device of claim 8, wherein the HARQ feedback includes the negative-only acknowledgement.

10. A processing device, comprising:

at least one processor; and at least one memory connected to the at least one processor and storing instructions that, based on being executed by the at least one processor, cause a first device to perform operations comprising:

receiving, by a first device from a second device, physical sidelink shared channel (PSSCH) data and sidelink control information (SCI) including a zone identity (ID), wherein the SCI is received through a PSSCH;

based on a hybrid automatic repeat request (HARQ) feedback for groupcast being enabled by the SCI, based on a negative-only acknowledgement being indicated by the SCI, based on obtaining a distance between a location of the first device and a central location of a nearest zone that is obtained based on the zone ID included in the SCI, based on the distance being smaller than or equal to a communication range requirement, and based on the first device failing to decode the PSSCH data related to a physical sidelink control channel (PSCCH). generating, by the first device, a negative acknowledgement of the PSSCH data; and transmitting, by the first device to the second device, the negative acknowledgement of the PSSCH data.

11. The processing device of claim 10, wherein the HARQ feedback includes the negative-only acknowledgement.

* * * * *